US009823939B2

(12) United States Patent
Abdallah

(10) Patent No.: US 9,823,939 B2
(45) Date of Patent: Nov. 21, 2017

(54) SYSTEM FOR AN INSTRUCTION SET AGNOSTIC RUNTIME ARCHITECTURE

(71) Applicant: Intel Corporation, Santa Clara, CA (US)

(72) Inventor: Mohammad Abdallah, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/807,271

(22) Filed: Jul. 23, 2015

(65) Prior Publication Data

US 2016/0026483 A1    Jan. 28, 2016

Related U.S. Application Data

(60) Provisional application No. 62/029,383, filed on Jul. 25, 2014.

(51) Int. Cl.
    G06F 9/45     (2006.01)
    G06F 9/455    (2006.01)
    G06F 9/44     (2006.01)

(52) U.S. Cl.
    CPC ............ *G06F 9/45516* (2013.01); *G06F 8/41* (2013.01); *G06F 9/4552* (2013.01);
    (Continued)

(58) Field of Classification Search
    CPC .......... G06F 8/433; G06F 8/443; G06F 8/445; G06F 9/45504; G06F 9/45516
    See application file for complete search history.

(56) References Cited

U.S. PATENT DOCUMENTS 4,456,954 A   6/1984   Bullions, III et al.
5,517,651 A   5/1996   Huck et al.
(Continued)

FOREIGN PATENT DOCUMENTS

WO    WO2012103209    8/2012
WO    WO2012103359    8/2012
(Continued)

OTHER PUBLICATIONS

Dullien et al., "A framework for automated architecture-independent gadget search", WOOT'10, Aug. 2010, pp. 1-10; <https://www.usenix.org/legacy/events/woot10/tech/full_papers/Dullien.pdf>.*

(Continued)

*Primary Examiner* — Thuy Dao
*Assistant Examiner* — Ben C Wang
(74) *Attorney, Agent, or Firm* — Nicholson De Vos Webster & Elliott, LLP

(57) ABSTRACT

A system for an agnostic runtime architecture. The system includes a close to bare metal JIT conversion layer, a runtime native instruction assembly component included within the conversion layer for receiving instructions from a guest virtual machine, and a runtime native instruction sequence formation component included within the conversion layer for receiving instructions from native code. The system further includes a dynamic sequence block-based instruction mapping component included within the conversion layer for code cache allocation and metadata creation, and is coupled to receive inputs from the runtime native instruction assembly component and the runtime native instruction sequence formation component, and wherein the dynamic sequence block-based instruction mapping component receives resulting processed instructions from the runtime native instruction assembly component and the runtime (Continued)

native instruction sequence formation component and allocates the resulting processed instructions to a processor for execution.

15 Claims, 26 Drawing Sheets

(52) U.S. Cl.
CPC .......... *G06F 9/45533* (2013.01); *G06F 8/445* (2013.01); *G06F 9/443* (2013.01); *G06F 9/45504* (2013.01)

(56) References Cited

U.S. PATENT DOCUMENTS

| | | |
|---|---|---|
| 5,574,873 A | 11/1996 | Davidian |
| 5,623,617 A | 4/1997 | Davidian |
| 6,139,199 A | 10/2000 | Rodriguez |
| 7,203,932 B1 | 4/2007 | Gaudet et al. |
| 8,046,563 B1 | 10/2011 | Agarwal et al. |
| 8,667,476 B1 | 3/2014 | Jung |
| 8,677,105 B2 | 3/2014 | Abdallah |
| 9,201,635 B2 | 12/2015 | Jennings et al. |
| 9,207,960 B2 * | 12/2015 | Abdallah ............ G06F 9/30174 |
| 9,213,563 B2 * | 12/2015 | Jennings ............. G06F 9/45516 |
| 9,483,295 B2 * | 11/2016 | Gschwind ........... G06F 9/45516 |
| 2004/0216104 A1 | 10/2004 | Fluhr et al. |
| 2006/0015707 A1 | 1/2006 | Brown et al. |
| 2006/0026371 A1 | 2/2006 | Chrysos et al. |
| 2007/0076010 A1 | 4/2007 | Swamy et al. |
| 2008/0098374 A1 | 4/2008 | Adl-tabatabai et al. |
| 2009/0089767 A1 | 4/2009 | Daynes et al. |
| 2009/0183180 A1 * | 7/2009 | Nelson ................ G06F 9/45533 719/319 |
| 2010/0161948 A1 | 6/2010 | Abdallah |
| 2010/0299499 A1 | 11/2010 | Golla et al. |
| 2011/0071816 A1 | 3/2011 | Bohizic et al. |
| 2011/0112820 A1 | 5/2011 | Bohizic et al. |
| 2011/0185155 A1 | 7/2011 | Henry et al. |
| 2012/0089968 A1 | 4/2012 | Varadarajan et al. |
| 2012/0198122 A1 | 8/2012 | Abdallah |
| 2012/0198157 A1 * | 8/2012 | Abdallah ............ G06F 12/0875 711/118 |
| 2012/0198168 A1 * | 8/2012 | Abdallah ............ G06F 12/0864 711/125 |
| 2012/0198209 A1 * | 8/2012 | Abdallah ............ G06F 9/30058 712/206 |
| 2012/0324429 A1 | 12/2012 | Manchanda et al. |
| 2013/0024619 A1 * | 1/2013 | Abdallah ............ G06F 9/30174 711/123 |
| 2013/0024661 A1 | 1/2013 | Abdallah |
| 2013/0152102 A1 * | 6/2013 | Zunuino ............. G06F 11/3006 718/104 |
| 2013/0246768 A1 * | 9/2013 | Gschwind ........... G06F 9/30036 712/227 |
| 2013/0290941 A1 | 10/2013 | Kruglick |
| 2014/0095832 A1 | 4/2014 | Haber et al. |
| 2014/0115569 A1 | 4/2014 | Jung |
| 2014/0181475 A1 | 6/2014 | Abdallah et al. |
| 2014/0181591 A1 | 6/2014 | Bijanki et al. |
| 2015/0121046 A1 | 4/2015 | Kunjan et al. |
| 2015/0186166 A1 * | 7/2015 | Jennings ................ G06F 9/4552 718/1 |
| 2015/0186169 A1 * | 7/2015 | Jennings ............. G06F 9/45516 717/148 |
| 2015/0277861 A1 | 10/2015 | Jennings et al. |
| 2015/0278516 A1 | 10/2015 | Caprioli |
| 2016/0026444 A1 * | 1/2016 | Abdallah ................ G06F 8/443 717/148 |
| 2016/0026445 A1 * | 1/2016 | Abdallah ................ G06F 8/443 717/148 |
| 2016/0026482 A1 * | 1/2016 | Abdallah .............. G06F 9/4552 703/26 |
| 2016/0026483 A1 | 1/2016 | Abdallah |
| 2016/0026484 A1 * | 1/2016 | Abdallah .............. G06F 9/5083 717/148 |
| 2016/0026486 A1 | 1/2016 | Abdallah |
| 2016/0026487 A1 * | 1/2016 | Abdallah ................... G06F 8/41 703/26 |

FOREIGN PATENT DOCUMENTS

| | | | |
|---|---|---|---|
| WO | WO2012103359 A2 * | 8/2012 | ............... G06F 1/00 |
| WO | WO2012103367 | 8/2012 | |
| WO | WO2012103369 | 8/2012 | |
| WO | WO2013077875 | 5/2013 | |
| WO | WO2013077876 | 5/2013 | |

OTHER PUBLICATIONS

Eusse et al., "Application-Specific Architecture Exploration Based on Processor-Agnostic Performance Estimation", ACM, Jun. 2015, SCOPES'15, pp. 84-87; <http://dl.acm.org/citation.cfm?id=2771932&CFID=906705582&CFTOKEN=43409599>.*
González-Álvarez et al., "Automatic design of domain-specific instructions for low-power processors", IEEE, Jul. 2015, ASAP 2015, pp. 1-8; <http://ieeexplore.ieee.org/document/7245697/>.*
Final Office Action from U.S. Appl. No. 14/807,308, dated Dec. 20, 2016, 23 pages.
Guan H., et al., "CoDBT: A Multi-Source Dynamic Binary Translator using Hardware-Software Collaborative Techniques," Journal of Systems Architecture; Shanghai Jiao Tong University, Oct. 2010, vol. 56(10), pp. 500-508.
International Preliminary Report on Patentability for Application No. PCT/US2015/041847, dated Feb. 9, 2017, 6 pages.
International Preliminary Report on Patentability for Application No. PCT/US2015/041850, dated Feb. 9, 2017, 6 pages.
International Preliminary Report on Patentability for Application No. PCT/US2015/041851, dated Feb. 9, 2017, 7 pages.
International Preliminary Report on Patentability for Application No. PCT/US2015/042002, dated Feb. 9, 2017, 8 pages.
International Preliminary Report on Patentability for Application No. PCT/US2015/042010, dated Feb. 9, 2017, 7 pages.
International Preliminary Report on Patentability for Application No. PCT/US2015/042019, dated Feb. 9, 2017, 7 pages.
International Preliminary Report on Patentability for Application No. PCT/US2015/042032, dated Feb. 9, 2017, 7 pages.
International Search Report and Written Opinion for Application No. PCT/US2015/041847, dated Nov. 4, 2015, 7 pages.
International Search Report and Written Opinion for Application No. PCT/US2015/041850, dated Nov. 19, 2015, 7 pages.
International Search Report and Written Opinion for Application No. PCT/US2015/041851, dated Nov. 20, 2015, 8 pages.
International Search Report and Written Opinion for Application No. PCT/US2015/042002, dated Nov. 6, 2015, 9 pages.
International Search Report and Written Opinion for Application No. PCT/US2015/042010, dated Nov. 4, 2015, 8 pages.
International Search Report and Written Opinion for Application No. PCT/US2015/042019, dated Nov. 6, 2015, 8 pages.
International Search Report and Written Opinion for Application No. PCT/US2015/042032, dated Nov. 6, 2015, 8 pages.
Non-Final Office Action from U.S. Appl. No. 14/807,308, dated Dec. 31, 2015, 14 pages.
Non-Final Office Action from U.S. Appl. No. 14/807,308, dated Jun. 17, 2016, 15 pages.
Non-Final Office Action from U.S. Appl. No. 14/807,343, dated Nov. 14, 2016, 29 pages.
Non-Final Office Action from U.S. Appl. No. 14/807,353, dated Aug. 10, 2016, 21 pages.
Non-Final Office Action from U.S. Appl. No. 14/807,353, dated Jan. 25, 2017, 25 pages.
Advisory Action from U.S. Appl. No. 14/807,308, dated Mar. 10, 2017, 3 pages.
Non-Final Office Action from U.S. Appl. No. 14/807,343, dated May 19, 2017, 31 pages.

(56) References Cited

OTHER PUBLICATIONS

Notice of Allowance from U.S. Appl. No. 14/807,308 dated Mar. 29, 2017, 8 pages.

* cited by examiner

Guest flag architecture emulation
Centralized flag architecture | Distributed flag architecture
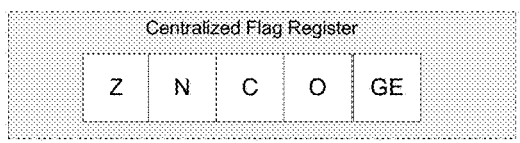
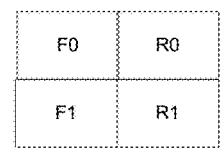
Distributed Flag Registers
Fig. 5

HW unrolled Optimization V.S. JIT compilers
Scheduling a head of a branch

Original un-optimized
Code in memory

Traditional JIT          HW unrolled optimization

R10 ← Move R2                     R3' ← Add R5,R8        R3' ← Add R5,R8
R7 ← Sub R1,R3                 R1' ← Shift R1          R1' ← Shift R1
Branch C to L1                  R10 ← Move R2         R10 ← Move R2
R3 ← Add R5,R8               R7 ← Sub R1,R3        R7 ← Sub R1,R3
R1 ← Shift R1                    Branch C to L1           Branch C to L1
L1: R6 ← Inc R6              L1: R6 ← Inc R6         R6 ← Inc R6
R2 ← Sub R4, R3              R2 ← Sub R4, R3'       R2 ← Sub R4, R3'
R8 ← And R1, R7              R8 ← And R1', R7      R8 ← And R1', R7

L2: R3' ← Move R3
                                   R1' ← Move R1
                                   Branch to L1

*Branch*
*Biased*
*untaken*

*Compensation code*

Fig. 15

HW unrolled Optimization V.S. JIT compilers
Scheduling a head of a store

Original un-optimized
Code in memory

R10 ← Move R2
R7 ← Sub R1,R3
[R2] ← Store R7
L1: R3 ← LD [R5]
R6 ← Inc R6
R2 ← Sub R4, R3
R8 ← And R1, R7

Traditional JIT

R3 ← LD [R5]
R10 ← Move R2
R7 ← Sub R1,R3
[R2] ← Store R7
Branch if R2 == R5 to L2
L3: R6 ← Inc R6
R2 ← Sub R4, R3'
R8 ← And R1, R7

L2: R3' ← LD [R5]
Branch to L3

*Compensation code*

HW unrolled optimization

R3 ← LD [R5]
R10 ← Move R2
R7 ← Sub R1,R3
[R2] ← Store R7
Branch if R2 == R5 to L1
R6 ← Inc R6
R2 ← Sub R4, R3'
R8 ← And R1, R7

Fig. 16

SYSTEM FOR AN INSTRUCTION SET AGNOSTIC RUNTIME ARCHITECTURE

This application claims the benefit of U.S. Provisional Application No. 62/029,383, filed Jul. 25, 2014, which is hereby incorporated by reference.

FIELD OF THE INVENTION

The present invention is generally related to digital computer systems, more particularly, to a system and method for selecting instructions comprising an instruction sequence.

BACKGROUND OF THE INVENTION

Processors are required to handle multiple tasks that are either dependent or totally independent. The internal state of such processors usually consists of registers that might hold different values at each particular instant of program execution. At each instant of program execution, the internal state image is called the architecture state of the processor.

When code execution is switched to run another function (e.g., another thread, process or program), then the state of the machine/processor has to be saved so that the new function can utilize the internal registers to build its new state. Once the new function is terminated then its state can be discarded and the state of the previous context will be restored and execution resumes. Such a switch process is called a context switch and usually includes 10's or hundreds of cycles especially with modern architectures that employ large number of registers (e.g., 64, 128, 256) and/or out of order execution.

In thread-aware hardware architectures, it is normal for the hardware to support multiple context states for a limited number of hardware-supported threads. In this case, the hardware duplicates all architecture state elements for each supported thread. This eliminates the need for context switch when executing a new thread. However, this still has multiple draw backs, namely the area, power and complexity of duplicating all architecture state elements (i.e., registers) for each additional thread supported in hardware. In addition, if the number of software threads exceeds the number of explicitly supported hardware threads, then the context switch must still be performed.

This becomes common as parallelism is needed on a fine granularity basis requiring a large number of threads. The hardware thread-aware architectures with duplicate context-state hardware storage do not help non-threaded software code and only reduces the number of context switches for software that is threaded. However, those threads are usually constructed for coarse grain parallelism, and result in heavy software overhead for initiating and synchronizing, leaving fine grain parallelism, such as function calls and loops parallel execution, without efficient threading initiations/auto generation. Such described overheads are accompanied with the difficulty of auto parallelization of such codes using state of the art compiler or user parallelization techniques for non-explicitly/easily parallelized/threaded software codes.

SUMMARY OF THE INVENTION

In one embodiment, the present invention is implemented as a system for an agnostic runtime architecture. The system includes a close to bare metal JIT conversion layer, a runtime native instruction assembly component included within the conversion layer for receiving instructions from a guest virtual machine, and a runtime native instruction sequence formation component included within the conversion layer for receiving instructions from native code. The system further includes a dynamic sequence block-based instruction mapping component included within the conversion layer for code cache allocation and metadata creation, and is coupled to receive inputs from the runtime native instruction assembly component and the runtime native instruction sequence formation component, and wherein the dynamic sequence block-based instruction mapping component receives resulting processed instructions from the runtime native instruction assembly component and the runtime native instruction sequence formation component and allocates the resulting processed instructions to a processor for execution.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

FIG. 5 shows a diagram depicting guest flag architecture emulation in accordance with one embodiment of the present invention.

FIG. 15 shows a diagram illustrating optimized scheduling instructions ahead of a branch in accordance with one embodiment of the present invention.

FIG. 16 shows a diagram illustrating optimized scheduling a load ahead of a store in accordance with one embodiment of the present invention.

DETAILED DESCRIPTION OF THE INVENTION

Figure 1:
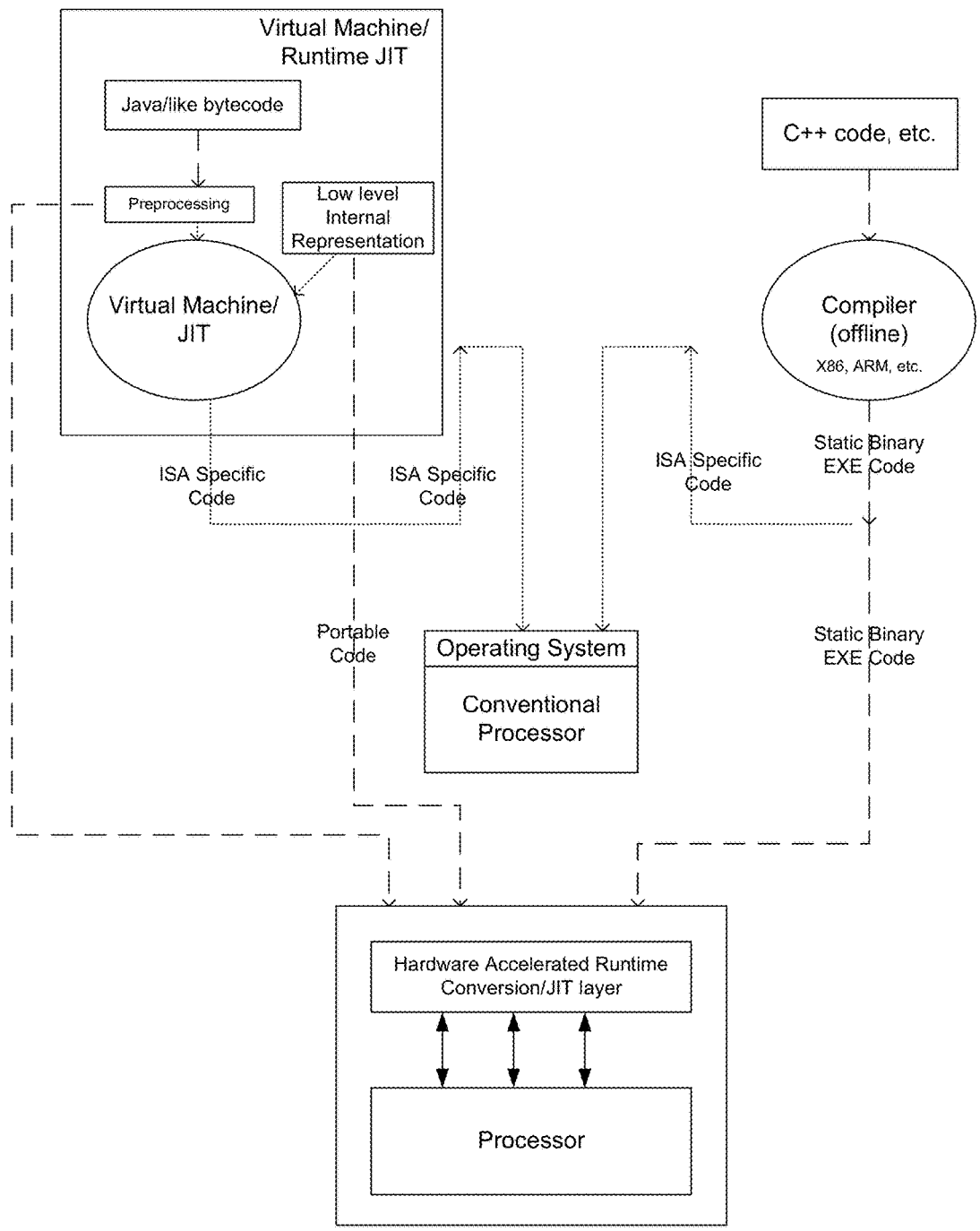
FIG. 1 shows an overview diagram of an architecture agnostic runtime system in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention are directed towards implementation of a universal agnostic runtime system. As used herein, embodiments of the present invention are also referred to as "VISC ISA agnostic runtime architecture". FIGS. 1 through 30 of the following detailed description illustrate the mechanisms processes and systems used to implement the universal agnostic runtime system.

Embodiments of the present invention are directed towards taking advantage of trends in the software industry, namely the trend whereby new systems software are increasingly being directed towards runtime compilation, optimization, and execution. The more traditional older software systems are suited towards static compilation.

Embodiments of the present invention advantageously are directed towards new system software which is trending towards runtime manipulation. For example, initially popular was Java virtual machine runtime implementations. But these implementations at the disadvantage of being between four and five times slower than the native execution. More recently, implementations have been more directed towards Java virtual machine implementation plus native code encapsulation (e.g., between two and three times slower). Even more recently, implementations have been directed towards Chrome and low level virtual machine runtime implementations (e.g., two times slower than native).

Embodiments of the present invention will implement an architecture that has and will use extensive runtime support. Embodiments of the present invention will have the ability to efficiently execute guest code (e.g., including run time guest code). Embodiments of the present invention be capable of efficiently converting guest/runtime instructions into native instructions. Embodiments of the present invention will be capable of efficiently mapping converted guest/runtime code to native code. Additionally, embodiments of the present invention will be capable of efficiently optimizing guest code or native code at runtime.

These abilities enable embodiments of the present invention to be well-suited for an era of architecture agnostic runtime systems. Embodiments of the present invention will be fully portable with the ability to run legacy application code, and such code can be optimized to run twice as fast or faster than on other architectures.

FIG. 1 shows an overview diagram of an architecture agnostic runtime system in accordance with one embodiment of the present invention. FIG. 1 shows a virtual machine runtime JIT (e.g., just-in-time compiler). The virtual machine runtime JIT includes Java like byte code as shown, low-level internal representation code, and a virtual machine JIT. The virtual machine JIT processes both the low-level internal representation code and the Java like byte code. The output of the virtual machine JIT is ISA specific code as shown.

Java code is machine independent. Programmers can write one program and it should run on many different machines. The java virtual machines are ISA specific, with each machine architecture having its own machine specific virtual machine. The output of the virtual machines is ISA specific code, generated dynamically at runtime.

FIG. 1 also shows a hardware accelerated conversion/JIT layer closely coupled to a processor. The runtime JIT/conversion layer allows the processor to use preprocessed java byte code that does not need to be processed by the virtual machine JIT, thereby speeding up the code performance considerably. The runtime JIT/conversion layer also allows the processor to use low level internal representations of the java byte code (e.g., shown within the virtual machine runtime JIT) that does not need to be processed by the virtual machine/JIT.

FIG. 1 also shows C++ code (e.g., or the like) that is processed by an off-line compiler (e.g., x86, ARM, etc.) that produces static binary execution code. C++ is a machine independent programming language. The compiler is machine specific (e.g., x86, ARM, etc.). The program is compiled offline using a machine specific compiler, thereby generating static binary code that is machine specific.

FIG. 1 shows how ISA specific code is executed by a conventional operating system on a conventional processor, while also showing advantageously how both portable code (e.g., from the low-level internal representation), preprocessed Java like byte code (e.g., from the virtual machine runtime JIT), and static binary executable code (e.g., from the compiler) can all be processed via the hardware accelerated conversion/JIT layer and processor.

It should be noted that the hardware accelerated conversion/JIT layer is a primary mechanism for achieving advantages of embodiments of the present invention. The following figures illustrate the manner of operation of the hardware accelerated conversion/JIT layer.

Figure 2:
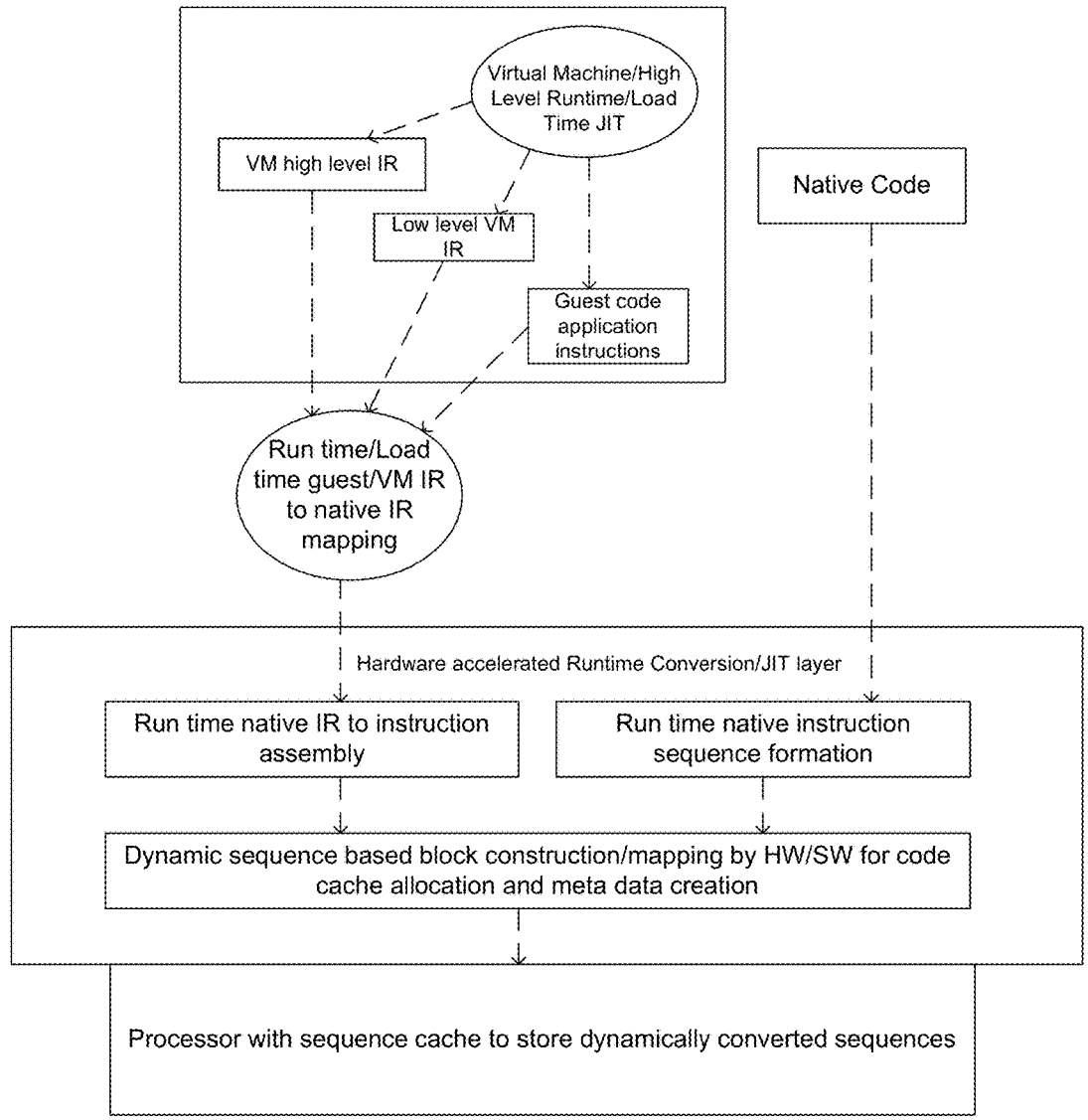
FIG. 2 shows a diagram depicting the hardware accelerated conversion/JIT layer in accordance with one embodiment of the present invention.

FIG. 2 shows a diagram depicting the hardware accelerated conversion/JIT layer in accordance with one embodiment of the present invention. The FIG. 2 diagrams shows how the virtual machine/high-level runtime/load time JIT produces virtual machine high-level instruction representations, low-level virtual machine instruction representations, and guest code application instructions. These all feed into a process for a runtime/load time guest/virtual machine instruction representation to native instruction representation mapping. This in turn is passed to the hardware accelerated conversion/JIT layer as shown, where it is processed by a runtime native instruction representation to instruction assembly component and then passed to a dynamic sequence-based block construction/mapping by hardware/software for code cache allocation and metadata creation component. In the FIG. 2 diagram, the hardware accelerated conversion/JIT layer is shown coupled to a processor with a sequence cache to store dynamically converted sequences. The FIG. 2 diagram also shows how native code can be processed directly by a runtime native instruction sequence formation component, which sends the resulting output to that dynamic sequence-based block construction/mapping by hardware/software for code cache allocation and metadata creation component.

Figure 3:
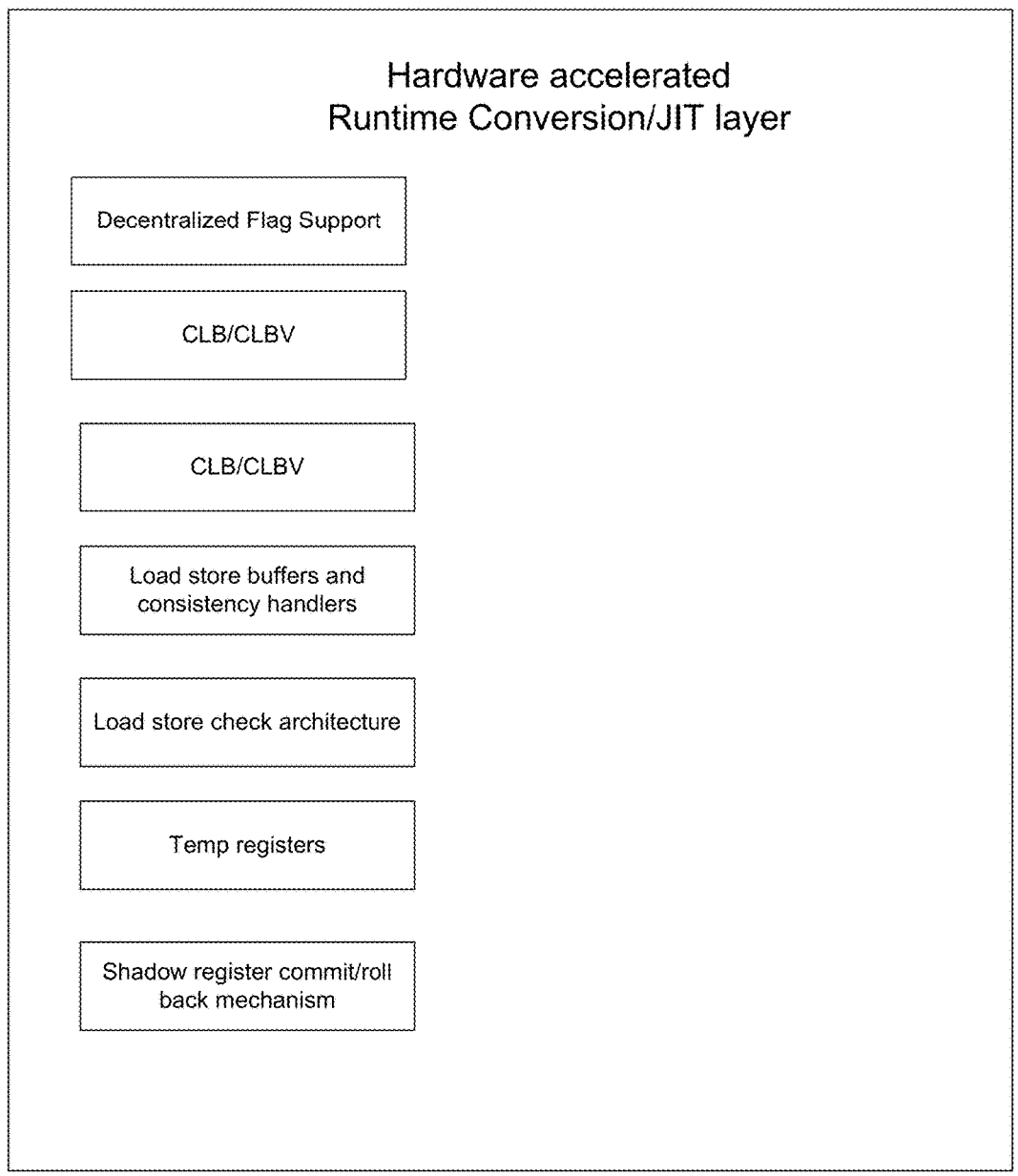
FIG. 3 shows a more detailed diagram of the hardware accelerated runtime conversion/JIT layer in accordance with one embodiment of the present invention.

FIG. 3 shows a more detailed diagram of the hardware accelerated runtime conversion/JIT layer in accordance with one embodiment of the present invention. FIG. 3 shows how the hardware accelerated runtime conversion/JIT layer includes hardware components that facilitate system emulation and system conversion. These components, such as decentralized flag support, CLB/CLBV, and the like, comprise customized hardware that works in support of both system emulation and system conversion. They make runtime software execution run at five times the speed of conventional processors or more. System emulation and system conversion are discussed below.

Figure 4:
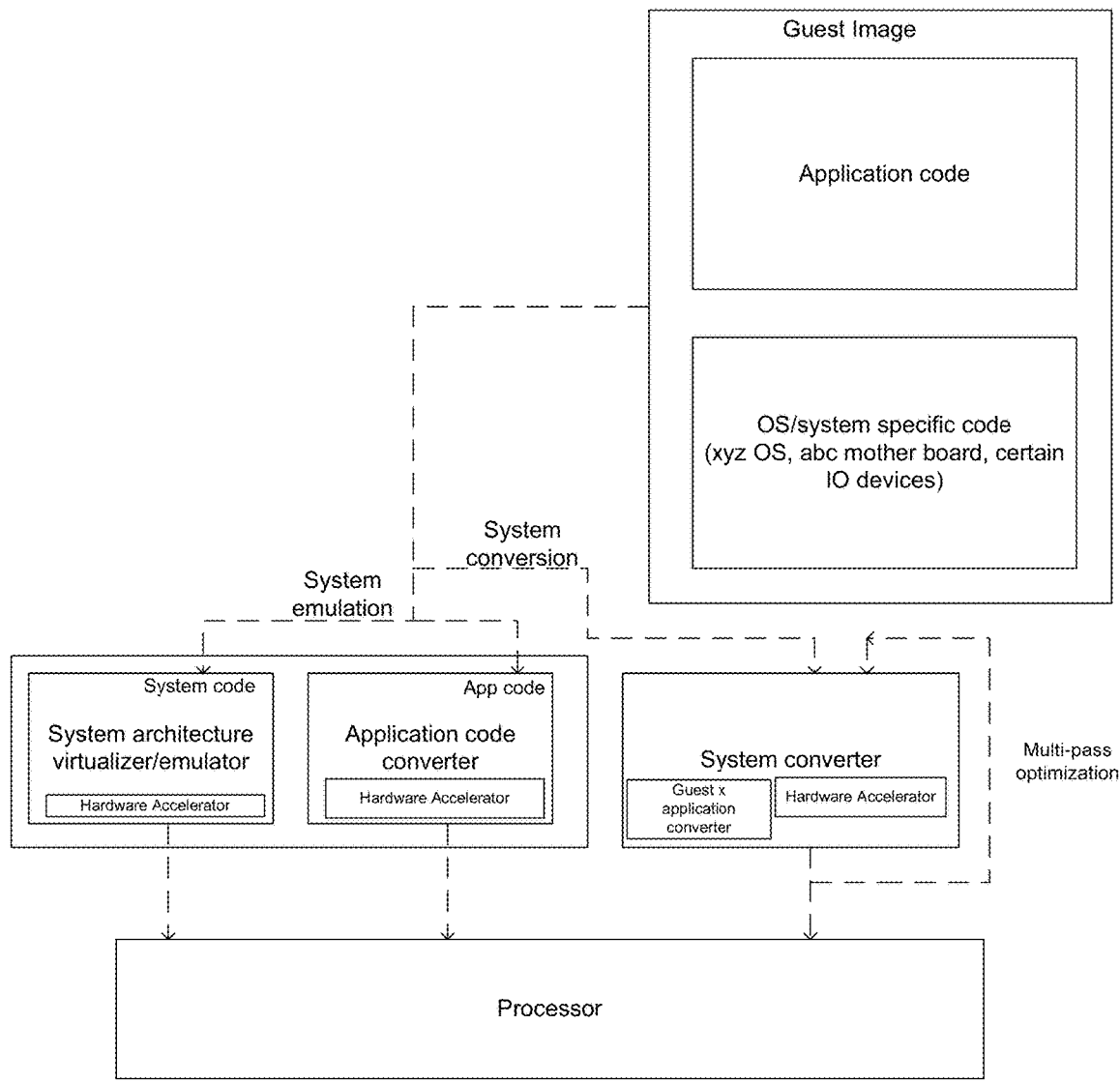
FIG. 4 shows a diagram depicting components for implementing system emulation and system conversion in accordance with one embodiment of the present invention.

FIG. 4 shows a diagram depicting components for implementing system emulation and system conversion in accordance with one embodiment of the present invention. FIG. 4 also shows an image having both application code and OS/system specific code.

Embodiments of the present invention use system emulation and system conversion in order to execute the application code and the OS/system specific code. Using system emulation the machine is emulating/virtualizing a different guest system architecture (containing both system and application code) than the architecture that the hardware supports. Emulation is provided by a system emulation/virtualization converter (e.g., which handles system code) and an application code converter (e.g., which handles application code). It should be noted that the application code converter is shown depicted with a bare metal component.

Using system conversion, the machine is converting code that has similar system architecture characteristics between the guest architecture and the architecture that the hardware supports, but the non-system part of the architectures are different (i.e., application instructions). The system converter is shown including a guest application converter component and a bare metal component. The system converter is also shown as potentially implementing a multi-pass optimization process. It should be noted that by referring to the term system conversion and emulation, a subsequent description herein is referring to a process that can use either the system emulation path or the system conversion path as shown on FIG. 4.

The following FIGS. 5 through 26 diagram the various processes and systems that are used to implement both system emulation and system conversion for supporting the universal agnostic runtime system/VISC ISA agnostic runtime architecture. With the processes and systems in the following diagrams, a hardware/software acceleration is provided to runtime code, which in turn, provides the increased performance of the architecture. Such hardware acceleration includes support for distributed flags, CLB, CLBV, hardware guest conversion tables, etc.

FIG. 5 shows a diagram depicting guest flag architecture emulation in accordance with one embodiment of the present invention. The left-hand side of FIG. 5 shows a centralized flag register having five flags. The right-hand side of FIG. 5 shows a distributed flag architecture having distributed flag registers wherein the flags are distributed amongst registers themselves.

During architecture emulation (e.g., system emulation or conversion), it is necessary for the distributed flag architecture to emulate the behavior of the centralized guest flag architecture. Distributed flag architecture can also be implemented by using multiple independent flag registers as opposed to a flag field associated with a data register. For example, data registers can be implemented as R0 to R15 while independent flag registers can be implemented as F0 to F15. Those flag registers in this case are not associated directly with the data registers.

Figure 6:
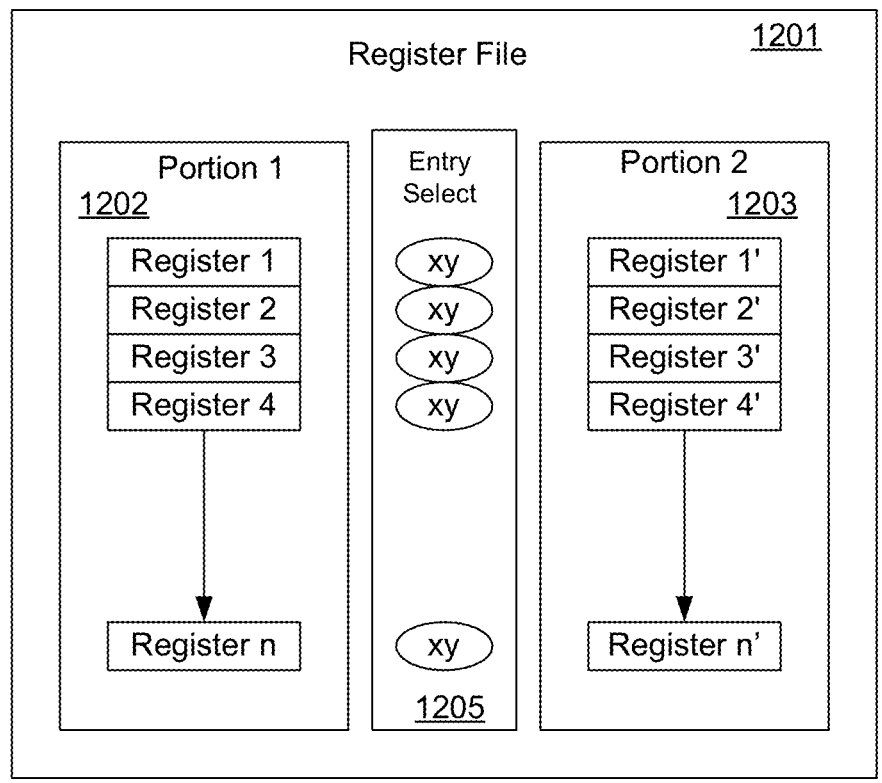
FIG. 6 shows a diagram of a unified register file in accordance with one embodiment of the present invention.

FIG. 6 shows a diagram of a unified register file 1201 in accordance with one embodiment of the present invention. As depicted in FIG. 5, the unified register file 1201 includes 2 portions 1202-1203 and an entry selector 1205. The unified register file 1201 implements support for architecture speculation for hardware state updates.

The unified register file 1201 enables the implementation of an optimized shadow register and committed register state management process. This process supports architecture speculation for hardware state updating. Under this process, embodiments of the present invention can support shadow register functionality and committed register functionality without requiring any cross copying between register memory. For example, in one embodiment, the functionality of the unified register file 1201 is largely provided by the entry selector 1205. In the FIG. 5 embodiment, each register file entry is composed from 2 pairs of registers, R & R', which are from portion 1 and the portion 2, respectively. At any given time, the register that is read from each entry is either R or R', from portion 1 or portion 2. There are 4 different combinations for each entry of the register file based on the values of x & y bits stored for each entry by the entry selector 1205.

Figure 7:
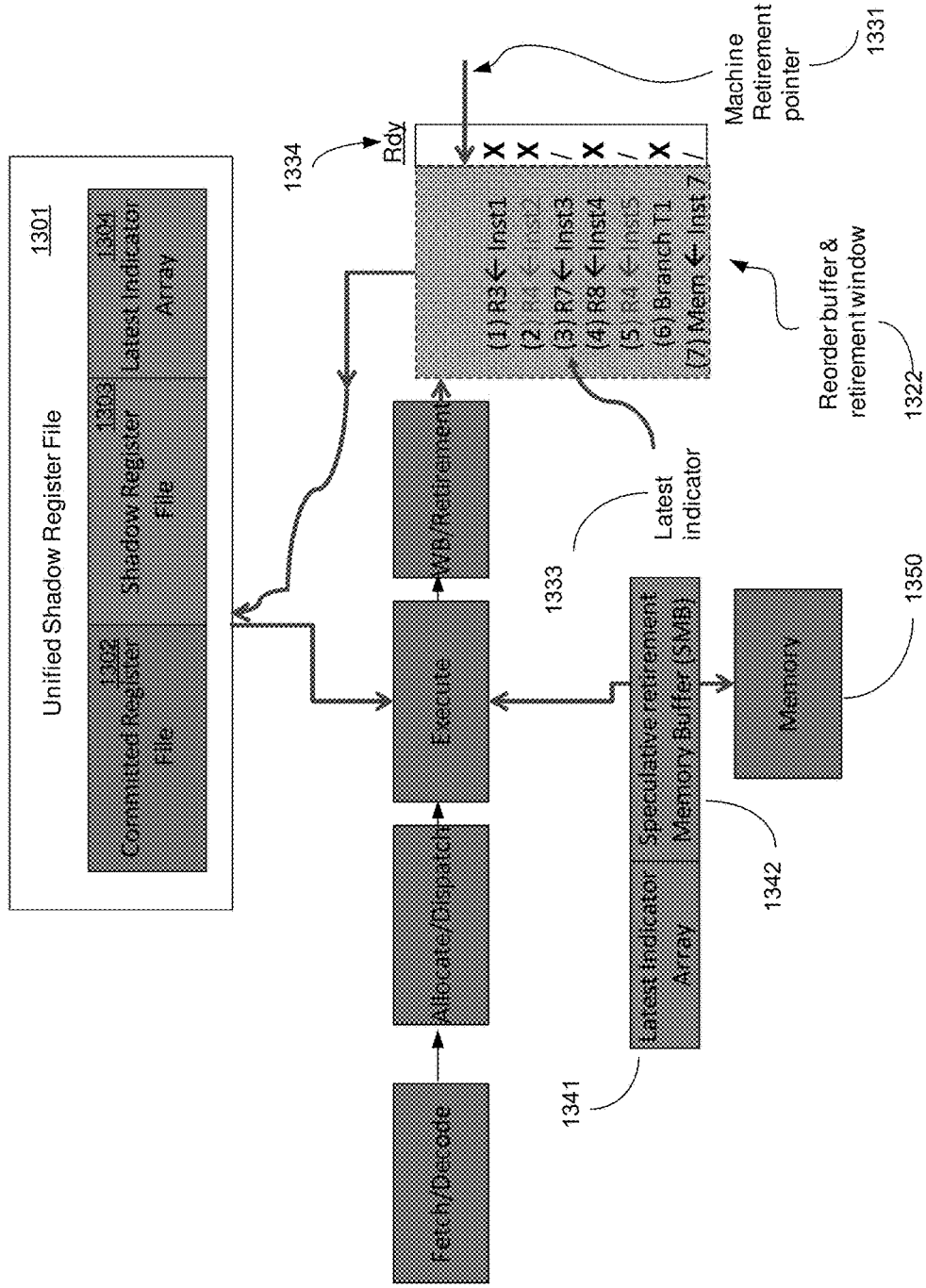
FIG. 7 shows a diagram of a unified shadow register file and pipeline architecture 1300 that supports speculative architectural states and transient architectural states in accordance with one embodiment of the present invention.

FIG. 7 shows a diagram of a unified shadow register file and pipeline architecture 1300 that supports speculative architectural states and transient architectural states in accordance with one embodiment of the present invention.

The FIG. 7 embodiment depicts the components comprising the architecture 1300 that supports instructions and results comprising architecture speculation states and supports instructions and results comprising transient states. As used herein, a committed architecture state comprises visible registers and visible memory that can be accessed (e.g., read and write) by programs executing on the processor. In contrast, a speculative architecture state comprises registers and/or memory that is not committed and therefore is not globally visible.

In one embodiment, there are four usage models that are enabled by the architecture 1300. A first usage model includes architecture speculation for hardware state updates.

A second usage model includes dual scope usage. This usage model applies to the fetching of 2 threads into the processor, where one thread executes in a speculative state and the other thread executes in the non-speculative state. In this usage model, both scopes are fetched into the machine and are present in the machine at the same time.

A third usage model includes the JIT (just-in-time) translation or compilation of instructions from one form to another. In this usage model, the reordering of architectural states is accomplished via software, for example, the JIT. The third usage model can apply to, for example, guest to native instruction translation, virtual machine to native instruction translation, or remapping/translating native micro instructions into more optimized native micro instructions.

A fourth usage model includes transient context switching without the need to save and restore a prior context upon returning from the transient context. This usage model applies to context switches that may occur for a number of reasons. One such reason could be, for example, the precise handling of exceptions via an exception handling context.

Referring again to FIG. 7, the architecture 1300 includes a number of components for implementing the 4 usage models described above. The unified shadow register file 1301 includes a first portion, committed register file 1302, a second portion, the shadow register file 1303, and a third portion, the latest indicator array 1304. A speculative retirement memory buffer 1342 and a latest indicator array 1340 are included. The architecture 1300 comprises an out of order architecture, hence, the architecture 1300 further includes a reorder buffer and retirement window 1332. The reorder and retirement window 1332 further includes a machine retirement pointer 1331, a ready bit array 1334 and a per instruction latest indicator, such as indicator 1333.

The first usage model, architecture speculation for hardware state updates, is further described in detail in accordance with one embodiment of the present invention. As described above, the architecture 1300 comprises a out of order architecture. The hardware of the architecture 1300 able to commit out of order instruction results (e.g., out of order loads and out of order stores and out of order register updates). The architecture 1300 utilizes the unified shadow register file to support speculative execution between committed registers and shadow registers. Additionally, the architecture 1300 utilizes the speculative load store buffer 1320 and the speculative retirement memory buffer 1342 to support speculative execution.

The architecture 1300 will use these components in conjunction with reorder buffer and retirement window 1332 to allow its state to retire correctly to the committed register file 1302 and to the visible memory 1350 even though the machine retired those in out of order manner internally to the unified shadow register file and the retirement memory buffer. For example, the architecture will use the unified shadow register file 1301 and the speculative memory 1342 to implement rollback and commit events based upon whether exceptions occur or do not occur. This functionality enables the register state to retire out of order to the unified shadow register file 1301 and enables the speculative retirement memory buffer 1342 to retire out of order to the visible memory 1350. As speculative execution proceeds and out of order instruction execution proceeds, if no branch has been missed predicted and there are no exceptions that occur, the machine retirement pointer 1331 advances until a commit event is triggered. The commit event causes the unified shadow register file to commit its contents by advancing its commit point and causes the speculative retirement memory buffer to commit its contents to the memory 1350 in accordance with the machine retirement pointer 1331.

For example, considering the instructions 1-7 that are shown within the reorder buffer and retirement window 1332, the ready bit array 1334 shows an "X" beside instructions are ready to execute and a "/" beside instructions that are not ready to execute. Accordingly, instructions 1, 2, 4, and 6 are allowed to proceed out of order. Subsequently, if an exception occurs, such as the instruction 6 branch being miss-predicted, the instructions that occur subsequent to instruction 6 can be rolled back. Alternatively, if no exception occurs, all of the instructions 1-7 can be committed by moving the machine retirement pointer 1331 accordingly.

The latest indicator array 1341, the latest indicator array 1304 and the latest indicator 1333 are used to allow out of order execution. For example, even though instruction 2 loads register R4 before instruction 5, the load from instruction 2 will be ignored once the instruction 5 is ready to occur. The latest load will override the earlier load in accordance with the latest indicator.

In the event of a branch prediction or exception occurring within the reorder buffer and retirement window 1332, a rollback event is triggered. As described above, in the event of a rollback, the unified shadow register file 1301 will rollback to its last committed point and the speculative retirement memory buffer 1342 will be flushed.

Figure 8:
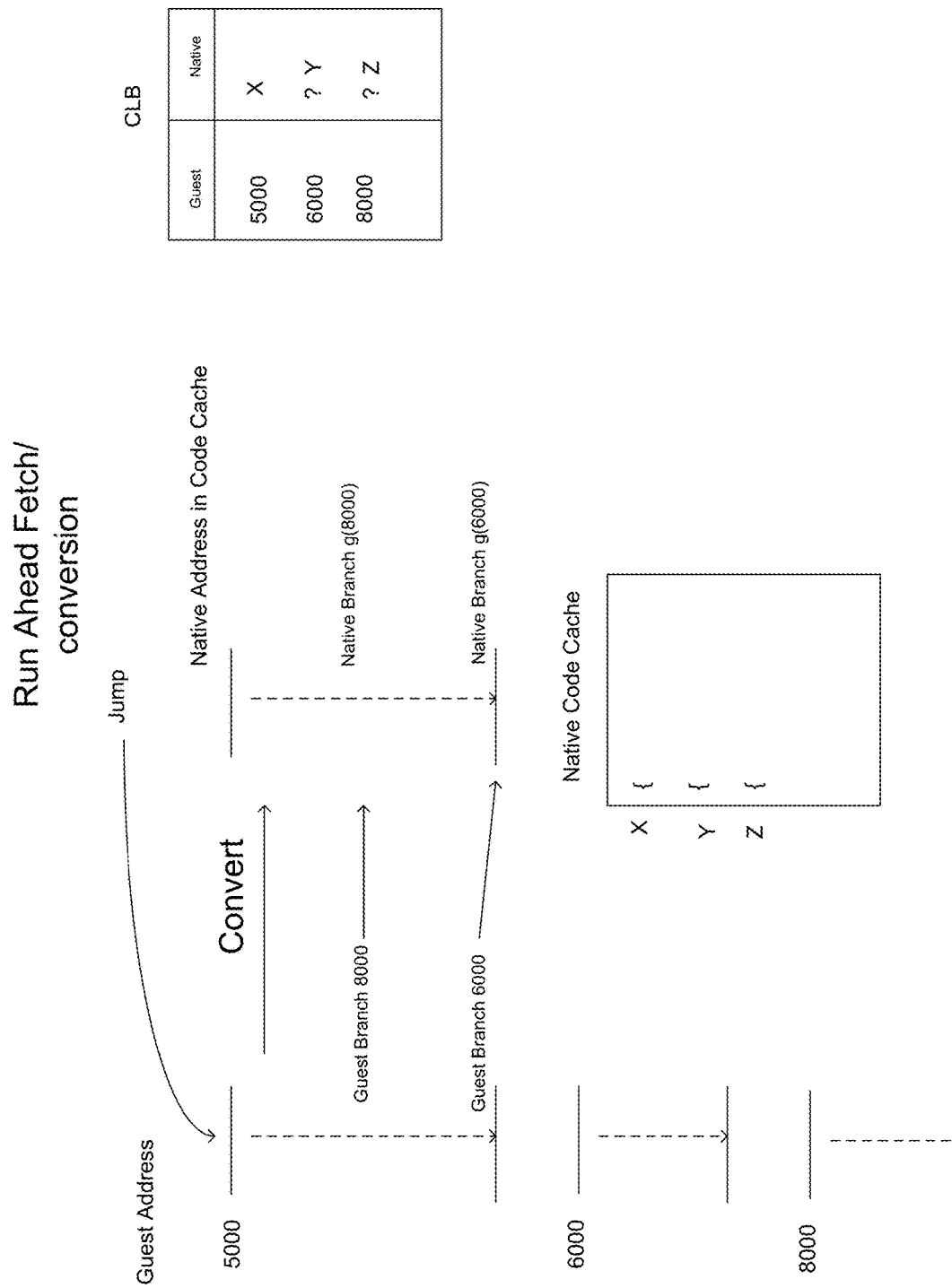
FIG. 8 shows a diagram depicting a run ahead batch/conversion process in accordance with one embodiment of the present invention.

FIG. 8 shows a diagram depicting a run ahead batch/conversion process in accordance with one embodiment of the present invention. This figure diagrams the manner in which guest code goes through a conversion process and is translated into native code. This native code in turn populates the native code cache, which is further used to populate the CLB. The figure shows how the guest code jumps to an address (e.g., 5000) that has not been previously converted. The conversion process then changes this guest code into corresponding native code as shown (e.g., including guest branch 8000 and guess branch 6000). The guess branches are converted into native branches in the code cache (e.g., native branch g8000 and native branch g6000). The machine is aware that the program counters for the native branches are going to be different than the program counters for the guess branches. This is shown by the notations in the native code cache (e.g., X, Y, and Z). As these translations are completed, the resulting translations are stored in the CLB for future use. This functionality greatly accelerates the translation of guest code into native code.

Figure 9:
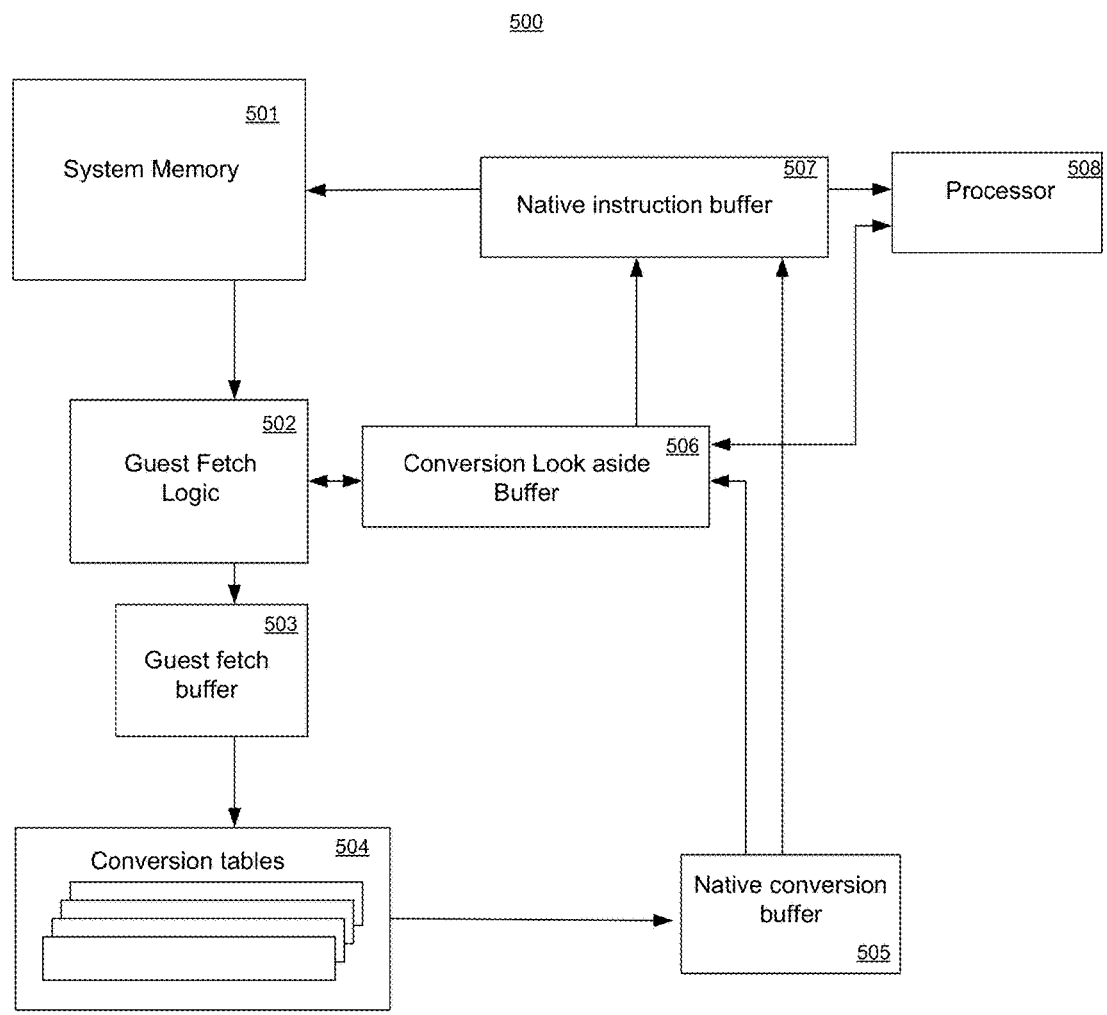
FIG. 9 shows a diagram of an exemplary hardware accelerated conversion system illustrating the manner in which guest instruction blocks and their corresponding native conversion blocks are stored within a cache in accordance with one embodiment of the present invention.

FIG. 9 shows a diagram of an exemplary hardware accelerated conversion system 500 illustrating the manner in which guest instruction blocks and their corresponding native conversion blocks are stored within a cache in accordance with one embodiment of the present invention. As illustrated in FIG. 9, a conversion look aside buffer 506 is used to cache the address mappings between guest and native blocks; such that the most frequently encountered native conversion blocks are accessed through low latency availability to the processor 508.

The FIG. 9 diagram illustrates the manner in which frequently encountered native conversion blocks are maintained within a high-speed low latency cache, the conversion look aside buffer 506. The components depicted in FIG. 9 implement hardware accelerated conversion processing to deliver the much higher level of performance.

The guest fetch logic unit 502 functions as a hardware-based guest instruction fetch unit that fetches guest instructions from the system memory 501. Guest instructions of a given application reside within system memory 501. Upon initiation of a program, the hardware-based guest fetch logic unit 502 starts prefetching guess instructions into a guest fetch buffer 503. The guest fetch buffer 507 accumulates the guest instructions and assembles them into guest instruction blocks. These guest instruction blocks are converted to corresponding native conversion blocks by using the conversion tables 504. The converted native instructions are accumulated within the native conversion buffer 505 until the native conversion block is complete. The native conversion block is then transferred to the native cache 507 and the mappings are stored in the conversion look aside buffer 506. The native cache 507 is then used to feed native instructions to the processor 508 for execution. In one embodiment, the functionality implemented by the guest fetch logic unit 502 is produced by a guest fetch logic state machine.

As this process continues, the conversion look aside buffer 506 is filled with address mappings of guest blocks to native blocks. The conversion look aside buffer 506 uses one or more algorithms (e.g., least recently used, etc.) to ensure that block mappings that are encountered more frequently are kept within the buffer, while block mappings that are rarely encountered are evicted from the buffer. In this manner, hot native conversion blocks mappings are stored within the conversion look aside buffer 506. In addition, it should be noted that the well predicted far guest branches within the native block do not need to insert new mappings in the CLB because their target blocks are stitched within a single mapped native block, thus preserving a small capacity efficiency for the CLB structure. Furthermore, in one embodiment, the CLB is structured to store only the ending guest to native address mappings. This aspect also preserves the small capacity efficiency of the CLB.

The guest fetch logic 502 looks to the conversion look aside buffer 506 to determine whether addresses from a guest instruction block have already been converted to a native conversion block. As described above, embodiments of the present invention provide hardware acceleration for conversion processing. Hence, the guest fetch logic 502 will look to the conversion look aside buffer 506 for pre-existing native conversion block mappings prior to fetching a guest address from system memory 501 for a new conversion.

In one embodiment, the conversion look aside buffer is indexed by guest address ranges, or by individual guest address. The guest address ranges are the ranges of addresses of guest instruction blocks that have been converted to native conversion blocks. The native conversion block mappings stored by a conversion look aside buffer are indexed via their corresponding guest address range of the corresponding guest instruction block. Hence, the guest fetch logic can compare a guest address with the guest address ranges or the individual guest address of converted blocks, the mappings of which are kept in the conversion look aside buffer 506 to determine whether a pre-existing native conversion block resides within what is stored in the native cache 507 or in the code cache of FIG. 6. If the pre-existing native conversion block is in either of the native cache or in the code cache, the corresponding native conversion instructions are forwarded from those caches directly to the processor.

In this manner, hot guest instruction blocks (e.g., guest instruction blocks that are frequently executed) have their corresponding hot native conversion blocks mappings maintained within the high-speed low latency conversion look aside buffer 506. As blocks are touched, an appropriate replacement policy ensures that the hot blocks mappings remain within the conversion look aside buffer. Hence, the guest fetch logic 502 can quickly identify whether requested guest addresses have been previously converted, and can forward the previously converted native instructions directly to the native cache 507 for execution by the processor 508. These aspects save a large number of cycles, since trips to system memory can take 40 to 50 cycles or more. These attributes (e.g., CLB, guest branch sequence prediction, guest & native branch buffers, native caching of the prior) allow the hardware acceleration functionality of embodiments of the present invention to achieve application performance of a guest application to within 80% to 100% the application performance of a comparable native application.

In one embodiment, the guest fetch logic 502 continually pre-fetches guest instructions for conversion independent of guest instruction requests from the processor 508. Native conversion blocks can be accumulated within a conversion buffer "code cache" in the system memory 501 for those less frequently used blocks. The conversion look aside buffer 506 also keeps the most frequently used mappings. Thus, if a requested guest address does not map to a guest address in the conversion look aside buffer, the guest fetch logic can check system memory 501 to determine if the guest address corresponds to a native conversion block stored therein.

In one embodiment, the conversion look aside buffer 506 is implemented as a cache and utilizes cache coherency protocols to maintain coherency with a much larger conversion buffer stored in higher levels of cache and system memory 501. The native instructions mappings that are stored within the conversion look aside buffer 506 are also written back to higher levels of cache and system memory 501. Write backs to system memory maintain coherency. Hence, cache management protocols can be used to ensure the hot native conversion blocks mappings are stored within the conversion look aside buffer 506 and the cold native conversion mappings blocks are stored in the system memory 501. Hence, a much larger form of the conversion buffer 506 resides in system memory 501.

It should be noted that in one embodiment, the exemplary hardware accelerated conversion system 500 can be used to implement a number of different virtual storage schemes. For example, the manner in which guest instruction blocks and their corresponding native conversion blocks are stored within a cache can be used to support a virtual storage scheme. Similarly, a conversion look aside buffer 506 that is used to cache the address mappings between guest and native blocks can be used to support the virtual storage scheme (e.g., management of virtual to physical memory mappings).

In one embodiment, the FIG. 9 architecture implements virtual instruction set processor/computer that uses a flexible conversion process that can receive as inputs a number of different instruction architectures. In such a virtual instruction set processor, the front end of the processor is implemented such that it can be software controlled, while taking advantage of hardware accelerated conversion processing to deliver the much higher level of performance. Using such an implementation, different guest architectures can be processed and converted while each receives the benefits of the hardware acceleration to enjoy a much higher level of performance. Example guest architectures include Java or JavaScript, x86, MIPS, SPARC, and the like. In one embodiment, the "guest architecture" can be native instructions (e.g., from a native application/macro-operation) and the conversion process produces optimize native instructions (e.g., optimized native instructions/micro-operations). The software controlled front end can provide a large degree of flexibility for applications executing on the processor. As described above, the hardware acceleration can achieve near native hardware speed for execution of the guest instructions of a guest application.

Figure 10:
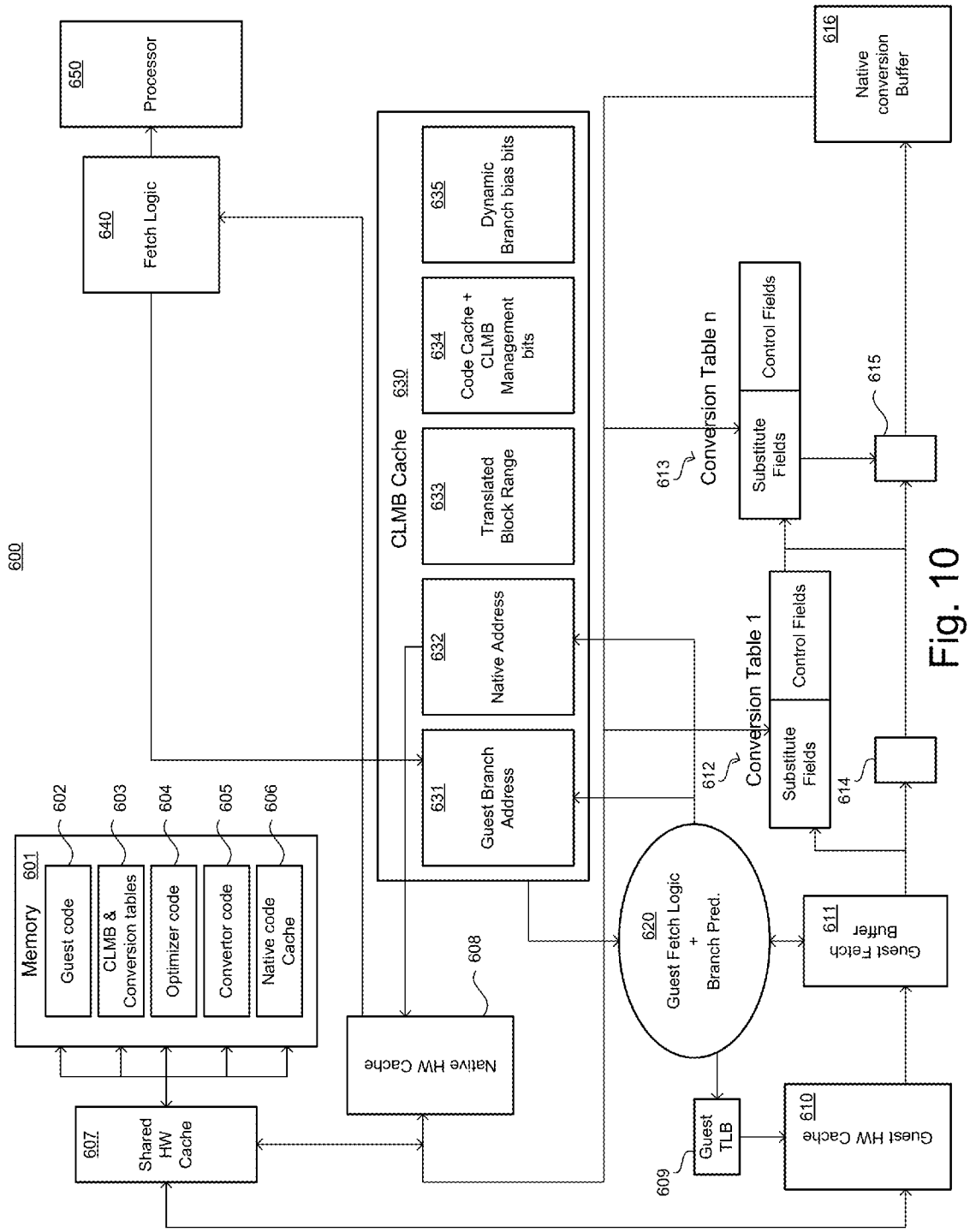
FIG. 10 shows a more detailed example of a hardware accelerated conversion system in accordance with one embodiment of the present invention.

FIG. 10 shows a more detailed example of a hardware accelerated conversion system 600 in accordance with one embodiment of the present invention. System 600 performers in substantially the same manner as system 500 described above. However, system 600 shows additional details describing functionality of an exemplary hardware acceleration process.

The system memory 601 includes the data structures comprising the guest code 602, the conversion look aside buffer 603, optimizer code 604, converter code 605, and native code cache 606. System 600 also shows a shared hardware cache 607 where guest instructions and native instructions can both be interleaved and shared. The guest hardware cache 610 catches those guest instructions that are most frequently touched from the shared hardware cache 607.

The guest fetch logic 620 pre-fetches guest instructions from the guest code 602. The guest fetch logic 620 interfaces with a TLB 609 which functions as a conversion look aside buffer that translates virtual guest addresses into corresponding physical guest addresses. The TLB 609 can forward hits directly to the guest hardware cache 610. Guest instructions that are fetched by the guest fetch logic 620 are stored in the guest fetch buffer 611.

The conversion tables 612 and 613 include substitute fields and control fields and function as multilevel conversion tables for translating guest instructions received from the guest fetch buffer 611 into native instructions.

The multiplexers 614 and 615 transfer the converted native instructions to a native conversion buffer 616. The native conversion buffer 616 accumulates the converted native instructions to assemble native conversion blocks. These native conversion blocks are then transferred to the native hardware cache 600 and the mappings are kept in the conversion look aside buffer 630.

The conversion look aside buffer 630 includes the data structures for the converted blocks entry point address 631, the native address 632, the converted address range 633, the code cache and conversion look aside buffer management bits 634, and the dynamic branch bias bits 635. The guest branch address 631 and the native address 632 comprise a guest address range that indicates which corresponding native conversion blocks reside within the converted lock range 633. Cache management protocols and replacement policies ensure the hot native conversion blocks mappings reside within the conversion look aside buffer 630 while the cold native conversion blocks mappings reside within the conversion look aside buffer data structure 603 in system memory 601.

As with system 500, system 600 seeks to ensure the hot blocks mappings reside within the high-speed low latency conversion look aside buffer 630. Thus, when the fetch logic 640 or the guest fetch logic 620 looks to fetch a guest address, in one embodiment, the fetch logic 640 can first check the guest address to determine whether the corresponding native conversion block resides within the code cache 606. This allows a determination as to whether the requested guest address has a corresponding native conversion block in the code cache 606. If the requested guest address does not reside within either the buffer 603 or 608, or the buffer 630, the guest address and a number of subsequent guest instructions are fetched from the guest code 602 and the conversion process is implemented via the conversion tables 612 and 613. In this manner, embodiments of the present invention can implement run ahead guest fetch and decode, table lookup and instruction field assembly.

Figure 11:
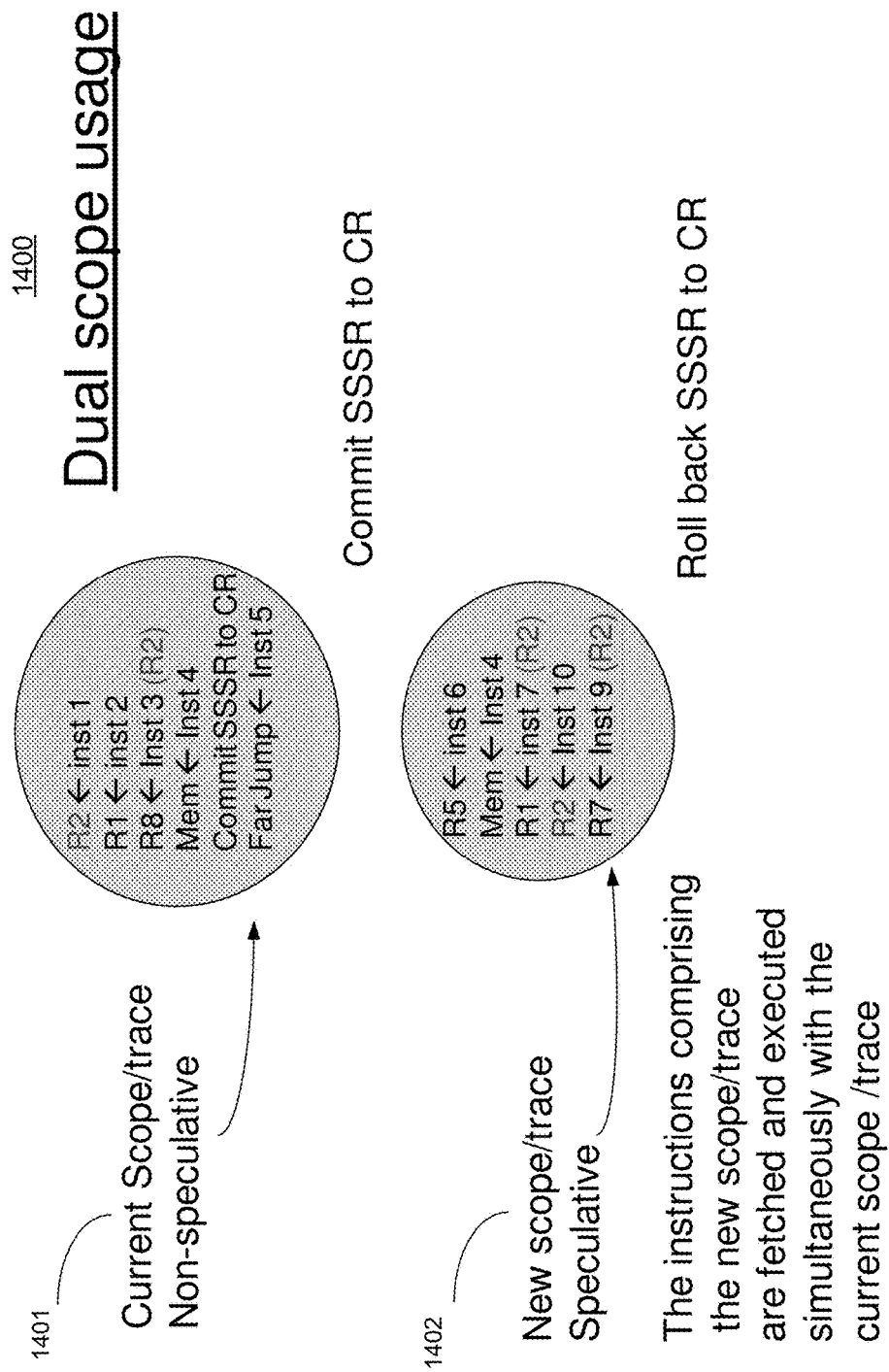
FIG. 11 shows a diagram of the second usage model, including dual scope usage in accordance with one embodiment of the present invention.

FIG. 11 shows a diagram 1400 of the second usage model, including dual scope usage in accordance with one embodiment of the present invention. As described above, this usage model applies to the fetching of 2 threads into the processor, where one thread executes in a speculative state and the other thread executes in the non-speculative state. In this usage model, both scopes are fetched into the machine and are present in the machine at the same time.

As shown in diagram 1400, 2 scope/traces 1401 and 1402 have been fetched into the machine. In this example, the scope/trace 1401 is a current non-speculative scope/trace. The scope/trace 1402 is a new speculative scope/trace. Architecture 1300 enables a speculative and scratch state that allows 2 threads to use those states for execution. One thread (e.g., 1401) executes in a non-speculative scope and the other thread (e.g., 1402) uses the speculative scope. Both scopes can be fetched into the machine and be present at the same time, with each scope set its respective mode differently. The first is non-speculative and the other is speculative. So the first executes in CR/CM mode and the other executes in SR/SM mode. In the CR/CM mode, committed registers are read and written to, and memory writes go to memory. In the SR/SM mode, register writes go to SSSR, and register reads come from the latest write, while memory writes the retirement memory buffer (SMB).

One example will be a current scope that is ordered (e.g., 1401) and a next scope that is speculative (e.g., 1402). Both can be executed in the machine as dependencies will be honored because the next scope is fetched after the current scope. For example, in scope 1401, at the "commit SSSR to CR", registers and memory up to this point are in CR mode while the code executes in CR/CM mode. In scope 1402, the code executes in SR and SM mode and can be rolled back if an exception happens. In this manner, both scopes execute at the same time in the machine but each is executing in a different mode and reading and writing registers accordingly.

Figure 12:
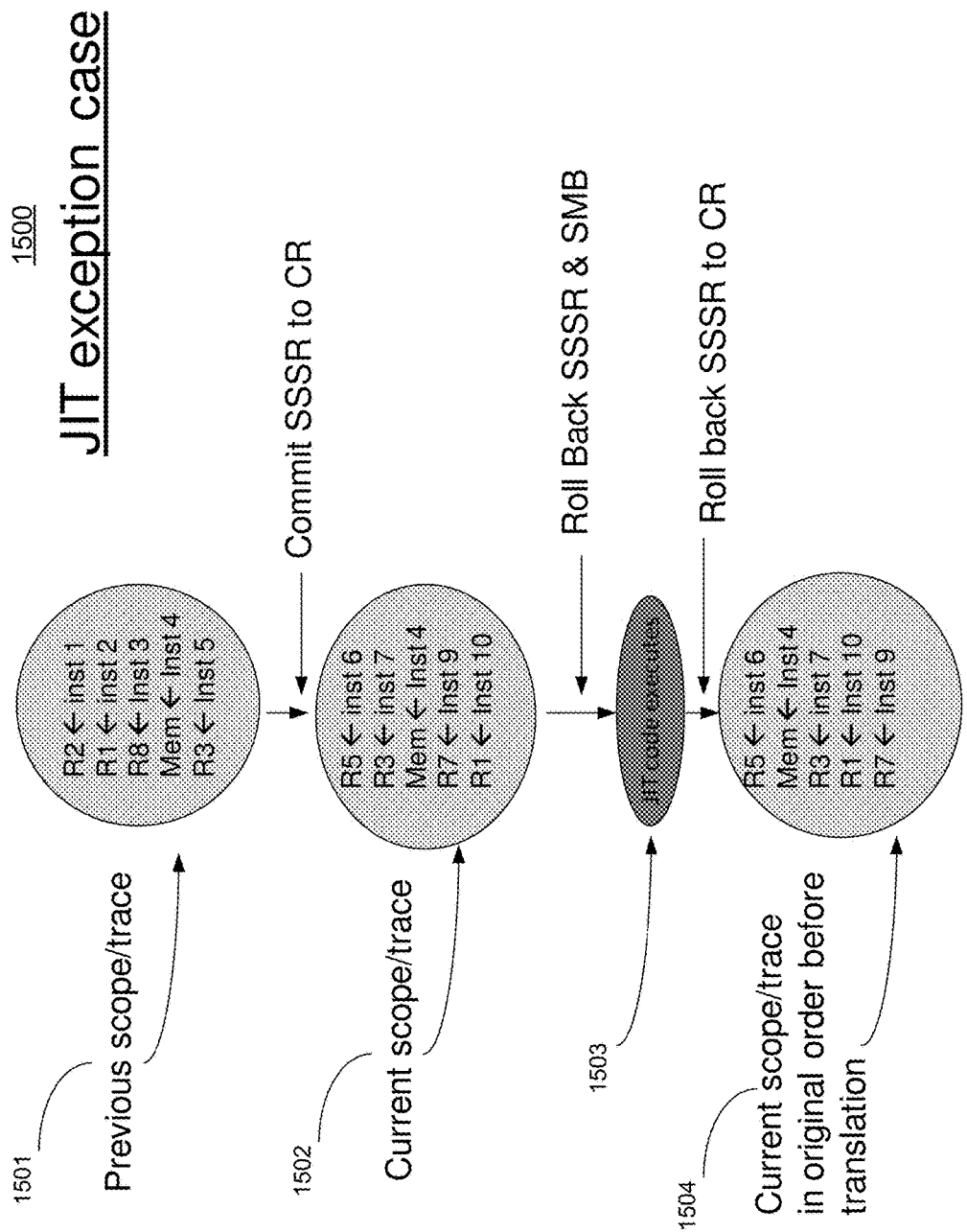
FIG. 12 shows a diagram of the third usage model, including transient context switching without the need to FIG. 13 shows a diagram depicting a case where the exception in the instruction sequence is because translation for subsequent code is needed in accordance with one embodiment of the present invention.

FIG. 12 shows a diagram of the third usage model, including transient context switching without the need to save and restore a prior context upon returning from the transient context in accordance with one embodiment of the present invention. As described above, this usage model applies to context switches that may occur for a number of reasons. One such reason could be, for example, the precise handling of exceptions via an exception handling context.

The third usage model occurs when the machine is executing translated code and it encounters a context switch (e.g., exception inside of the translated code or if translation for subsequent code is needed). In the current scope (e.g., prior to the exception), SSSR and the SMB have not yet committed their speculative state to the guest architecture state. The current state is running in SR/SM mode. When the exception occurs the machine switches to an exception handler (e.g., a convertor) to take care of exception precisely. A rollback is inserted, which causes the register state to roll back to CR and the SMB is flushed. The convertor code will run in SR/CM mode. During execution of convertor code the SMB is retiring its content to memory without waiting for a commit event. The registers are written to SSSR without updating CR. Subsequently, when the convertor is finished and before switching back to executing converted code, it rolls back the SSSR (e.g., SSSR is rolled back to CR). During this process the last committed Register state is in CR.

This is shown in diagram 1500 where the previous scope/trace 1501 has committed from SSSR into CR. The current scope/trace 1502 is speculative. Registers and memory and this scope are speculative and execution occurs under SR/SM mode. In this example, an exception occurs in the scope 1502 and the code needs to be re-executed in the original order before translation. At this point, SSSR is rolled back and the SMB is flushed. Then the JIT code 1503 executes. The JIT code rolls back SSSR to the end of scope 1501 and flushes the SMB. Execution of the JIT is under SC/CM mode. When the JIT is finished, the SSSR is rolled back to CR and the current scope/trace 1504 then re-executes in the original translation order in CR/CM mode. In this manner, the exception is handled precisely at the exact current order.

Figure 13:
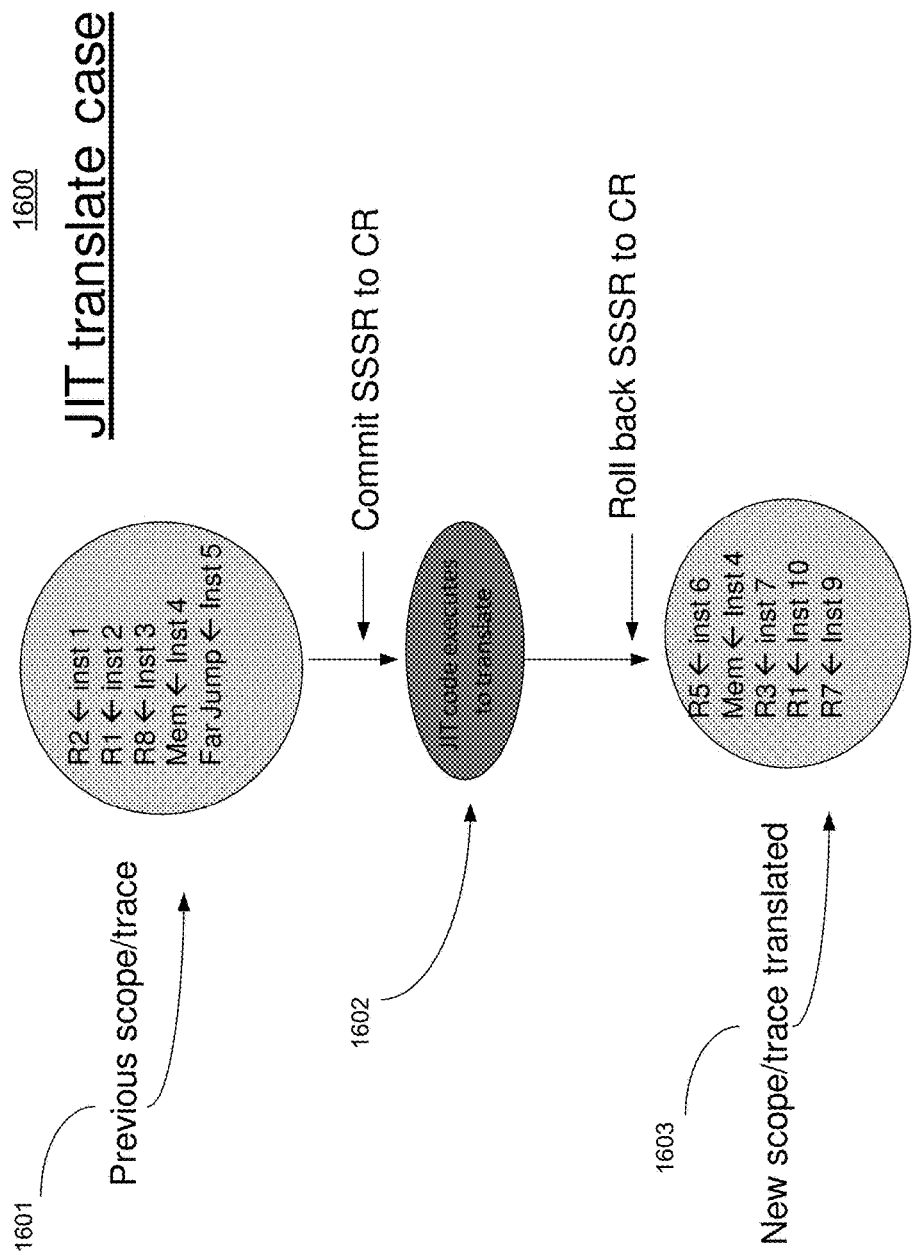

FIG. 13 shows a diagram 1600 depicting a case where the exception in the instruction sequence is because translation for subsequent code is needed in accordance with one embodiment of the present invention. As shown in diagram 1600, the previous scope/trace 1601 concludes with a far jump to a destination that is not translated. Before jumping to a far jump destination, SSSR is committed to CR. The JIT code 1602 then executes to translate the guess instructions at the far jump destination (e.g., to build a new trace of native instructions). Execution of the JIT is under SR/CM mode. At the conclusion of JIT execution, the register state is rolled back from SSSR to CR, and the new scope/trace 1603 that was translated by the JIT begins execution. The new scope/trace continues execution from the last committed point of the previous scope/trace 1601 in the SR/SM mode.

Figure 14:
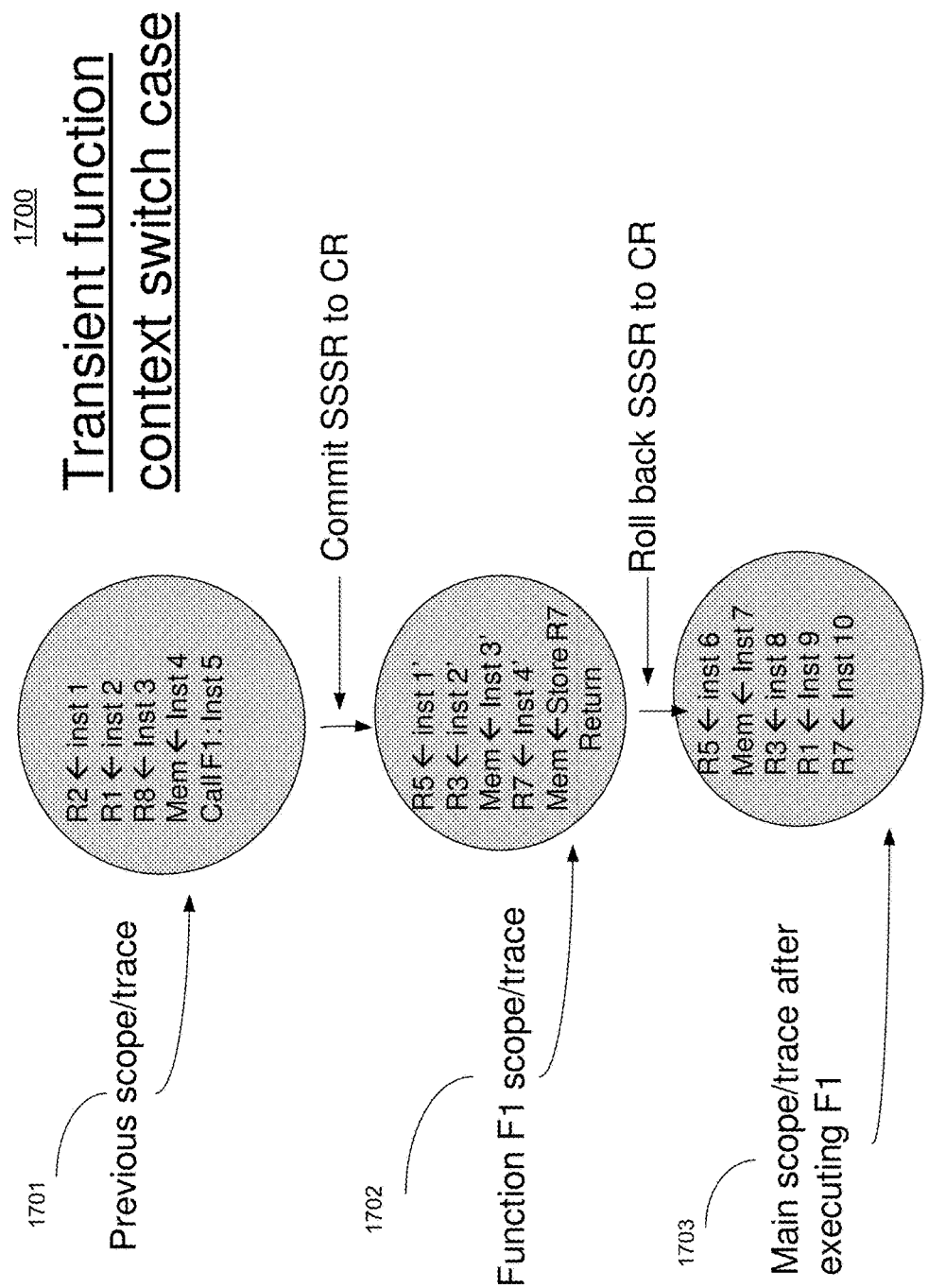
FIG. 14 shows a diagram of the fourth usage model, including transient context switching without the need to save and restore a prior context upon returning from the transient context in accordance with one embodiment of the present invention.

FIG. 14 shows a diagram 1700 of the fourth usage model, including transient context switching without the need to save and restore a prior context upon returning from the transient context in accordance with one embodiment of the present invention. As described above, this usage model applies to context switches that may occur for a number of reasons. One such reason could be, for example, the processing inputs or outputs via an exception handling context.

Diagram 1700 shows a case where a previous scope/trace 1701 executing under CR/CM mode ends with a call of function F1. Register state up to that point is committed from SSSR to CR. The function F1 scope/trace 1702 then begins executing speculatively under SR/CM mode. The function F1 then ends with a return to the main scope/trace 1703. At this point, the register state is rollback from SSSR to CR. The main scope/trace 1703 resumes executing in the CR/CM mode.

FIG. 15 shows a diagram illustrating optimized scheduling instructions ahead of a branch in accordance with one embodiment of the present invention. As illustrated in FIG. 15, a hardware optimized example is depicted alongside a traditional just-in-time compiler example. The left-hand side of FIG. 15 shows the original un-optimized code including the branch biased untaken, "Branch C to L1". The middle column of FIG. 15 shows a traditional just-in-time compiler optimization, where registers are renamed and instructions are moved ahead of the branch. In this example, the just-in-time compiler inserts compensation code to account for those occasions where the branch biased decision is wrong (e.g., where the branch is actually taken as opposed to untaken). In contrast, the right column of FIG. 15 shows the hardware unrolled optimization. In this case, the registers are renamed and instructions are moved ahead of the branch.

However, it should be noted that no compensation code is inserted. The hardware keeps track of whether branch biased decision is true or not. In case of wrongly predicted branches, the hardware automatically rolls back it's state in order to execute the correct instruction sequence. The hardware optimizer solution is able to avoid the use of compensation code because in those cases where the branch is miss predicted, the hardware jumps to the original code in memory and executes the correct sequence from there, while flushing the miss predicted instruction sequence.

FIG. 16 shows a diagram illustrating optimized scheduling a load ahead of a store in accordance with one embodiment of the present invention. As illustrated in FIG. 16, a hardware optimized example is depicted alongside a traditional just-in-time compiler example. The left-hand side of FIG. 16 shows the original un-optimized code including the store, "R3←LD [R5]". The middle column of FIG. 16 shows a traditional just-in-time compiler optimization, where registers are renamed and the load is moved ahead of the store. In this example, the just-in-time compiler inserts compensation code to account for those occasions where the address of the load instruction aliases the address of the store instruction (e.g., where the load movement ahead of the store is not appropriate). In contrast, the right column of FIG. 16 shows the hardware unrolled optimization. In this case, the registers are renamed and the load is also moved ahead of the store. However, it should be noted that no compensation code is inserted. In a case where moving the load ahead of the store is wrong, the hardware automatically rolls back it's state in order to execute the correct instruction sequence. The hardware optimizer solution is able to avoid the use of compensation code because in those cases where the address alias-check branch is miss predicted, the hardware jumps to the original code in memory and executes the correct sequence from there, while flushing the miss predicted instruction sequence. In this case, the sequence assumes no aliasing. It should be noted that in one embodiment, the functionality diagrammed in FIG. 16 can be implemented by an instruction scheduling and optimizer component. Similarly, it should be noted that in one embodiment, the functionality diagrammed in FIG. 16 can be implemented by a software optimizer.

Additionally, with respect to dynamically unrolled sequences, it should be noted that instructions can pass prior path predicted branches (e.g., dynamically constructed branches) by using renaming. In the case of non-dynamically predicted branches, movements of instructions should consider the scopes of the branches. Loops can be unrolled to the extent desired and optimizations can be applied across the whole sequence. For example, this can be implemented by renaming destination registers of instructions moving across branches. One of the benefits of this feature is the fact that no compensation code or extensive analysis of the scopes of the branches is needed. This feature thus greatly speeds up and simplifies the optimization process.

Figure 17:
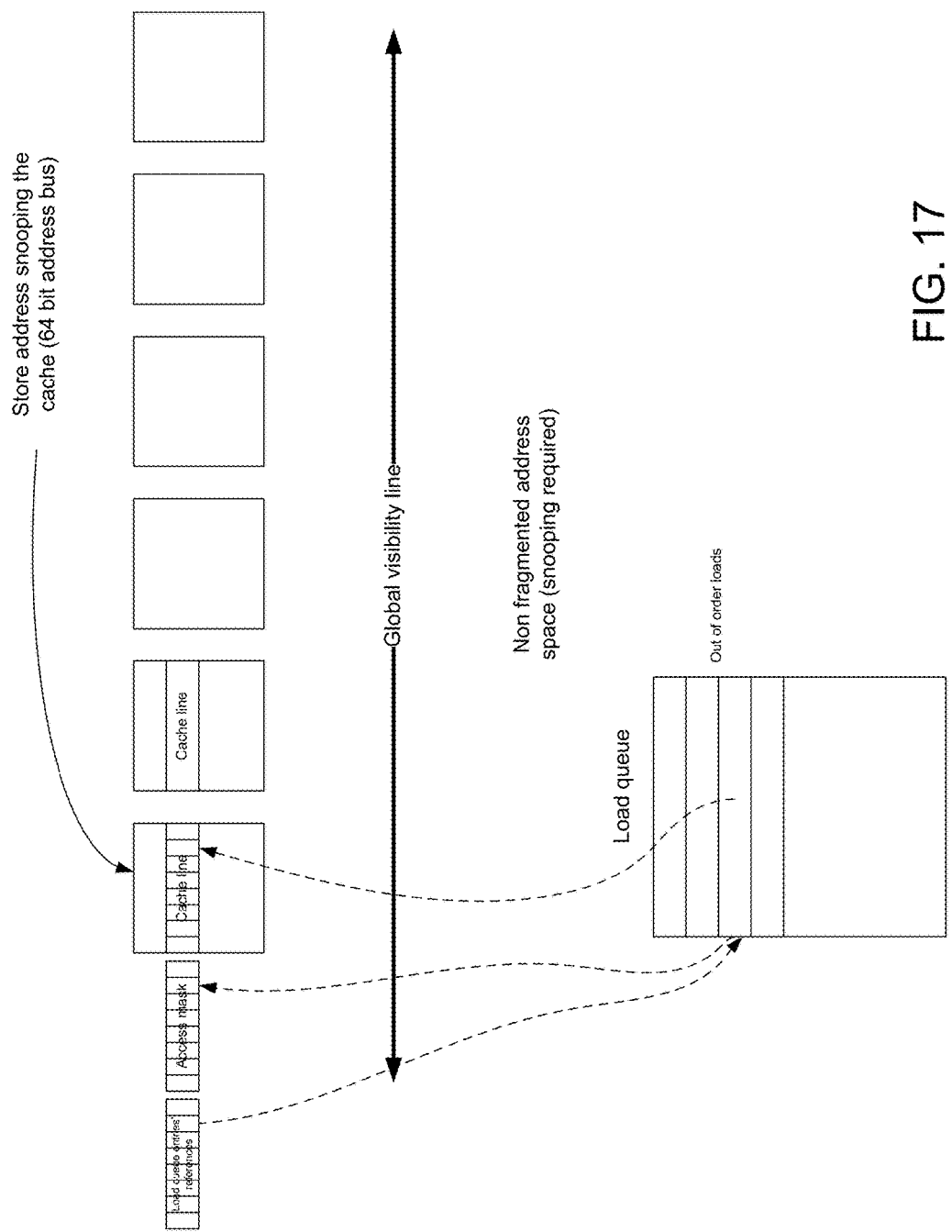
FIG. 17 shows a diagram of a store filtering algorithm in accordance with one embodiment of the present invention.

FIG. 17 shows a diagram of a store filtering algorithm in accordance with one embodiment of the present invention. An objective of the FIG. 17 embodiment is to filter the stores to prevent all stores from having to check against all entries in the load queue.

Stores snoop the caches for address matches to maintain coherency. If thread/core X load reads from a cache line, it marks the portion of the cache line from which it loaded data. Upon another thread/core Y store snooping the caches, if any such store overlaps that cache line portion, a miss-predict is caused for that load of thread/core X.

One solution for filtering these snoops is to track the load queue entries' references. In this case stores do not need to snoop the load queue. If the store has a match with the access mask, that load queue entry as obtained from the reference tracker will cause that load entry to miss predict.

In another solution (where there is no reference tracker), if the store has a match with the access mask, that store address will snoop the load queue entries and will cause the matched load entry to miss predict.

With both solutions, once a load is reading from a cache line, it sets the respective access mask bit. When that load retires, it resets that bit.

Figure 18:
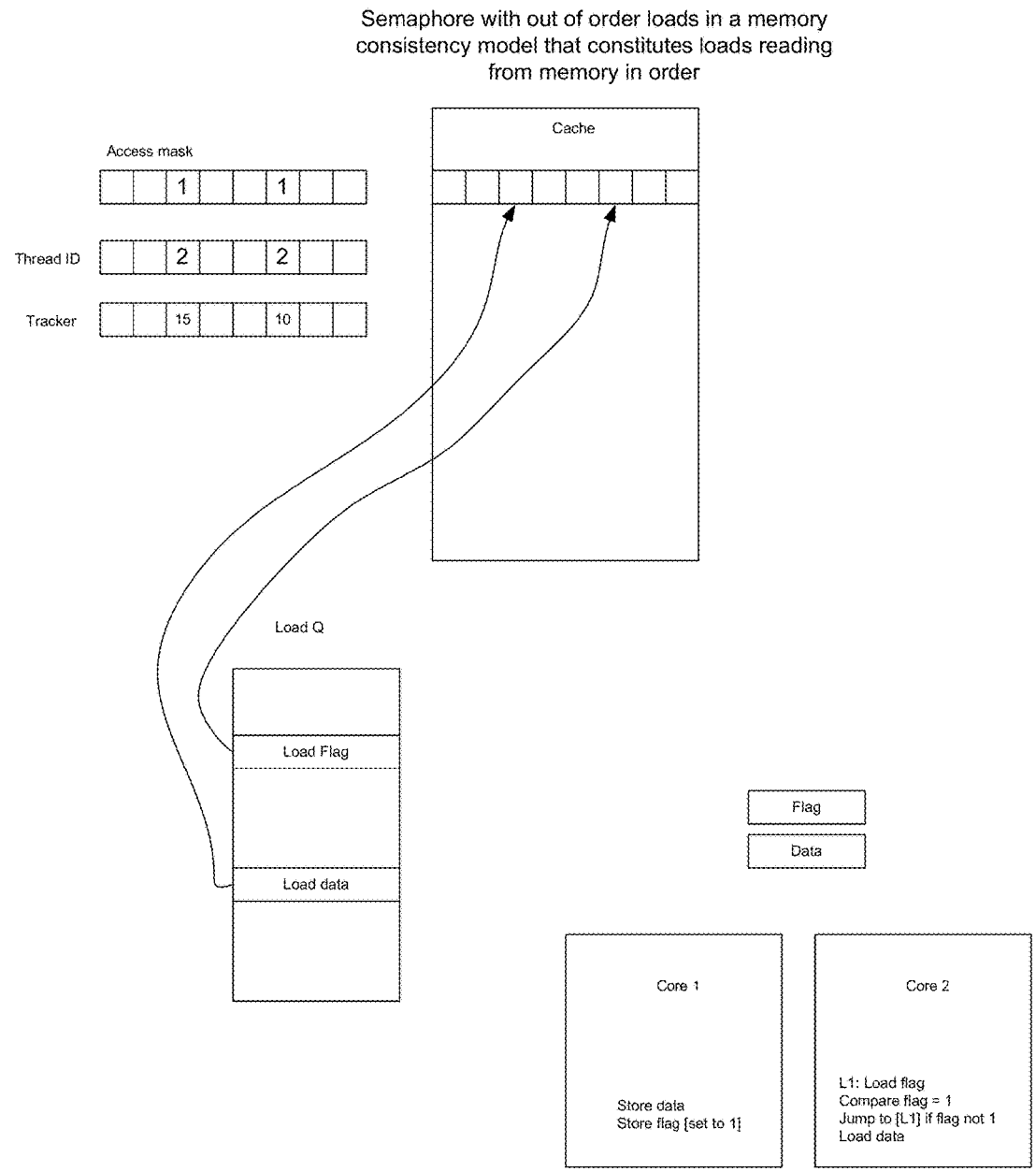
FIG. 18 shows a semaphore implementation with out of order loads in a memory consistency model that constitutes loads reading from memory in order, in accordance with one embodiment of the present invention.

FIG. 18 shows a semaphore implementation with out of order loads in a memory consistency model that constitutes loads reading from memory in order, in accordance with one embodiment of the present invention. As used herein, the term semaphore refers to a data construct that provides access control for multiple threads/cores to common resources.

In the FIG. 18 embodiment, the access mask is used to control accesses to memory resources by multiple threads/cores. The access mask functions by tracking which words of a cache line have pending loads. An out of order load sets the mask bit when accessing the word of the cache line, and clears the mask bit when that load retires. If a store from another thread/core writes to that word while the mask bit is set, it will signal the load queue entry corresponding to that load (e.g., via the tracker) to be miss-predicted/flushed or retried with its dependent instructions. The access mask also tracks thread/core.

In this manner, the access mask ensures the memory consistency rules are correctly implemented. Memory consistency rules dictates that stores update memory in order and loads read from memory in order for this semaphore to work across the two cores/threads. Thus, the code executed by core 1 and core 2, where they both access the memory locations "flag" and "data", will be executed correctly.

Figure 19:
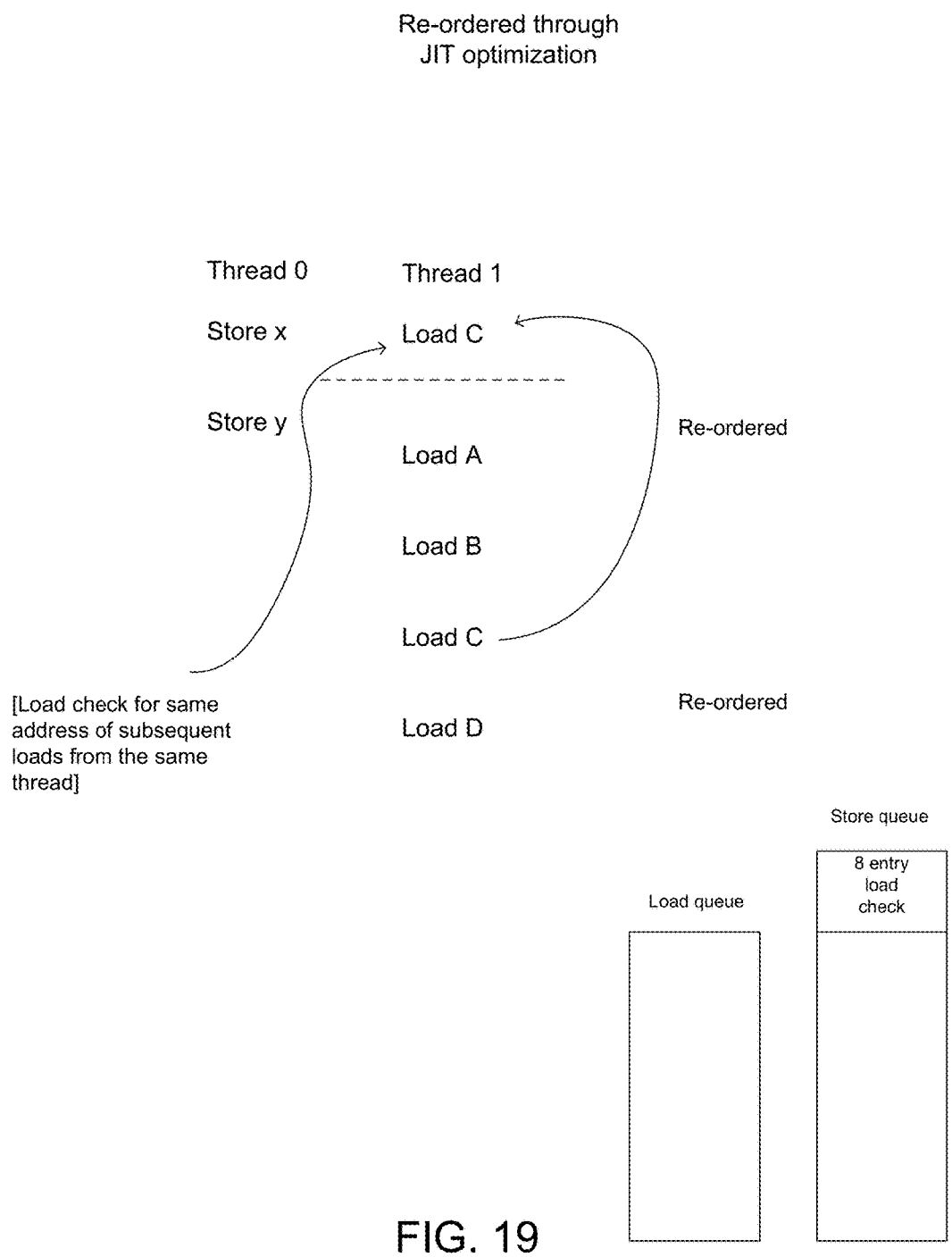
FIG. 19 shows a diagram of a reordering process through JIT optimization in accordance with one embodiment of the present invention.

FIG. 19 shows a diagram of a reordering process through JIT optimization in accordance with one embodiment of the present invention. FIG. 19 depicts memory consistency ordering (e.g., loads before loads ordering). Loads cannot dispatch ahead of other loads that are to the same address. For example, a load will check for the same address of subsequent loads from the same thread.

In one embodiment, all subsequent loads are checked for an address match. For this solution to work, the Load C check needs to stay in the store queue (e.g., or an extension thereof) after retirement up to the point of the original Load C location. The load check extension size can be determined by putting a restriction on the number of loads that a reordered load (e.g., Load C) can jump ahead of. It should be noted that this solution only works with partial store ordering memory consistency model (e.g., ARM consistency model).

Figure 20:
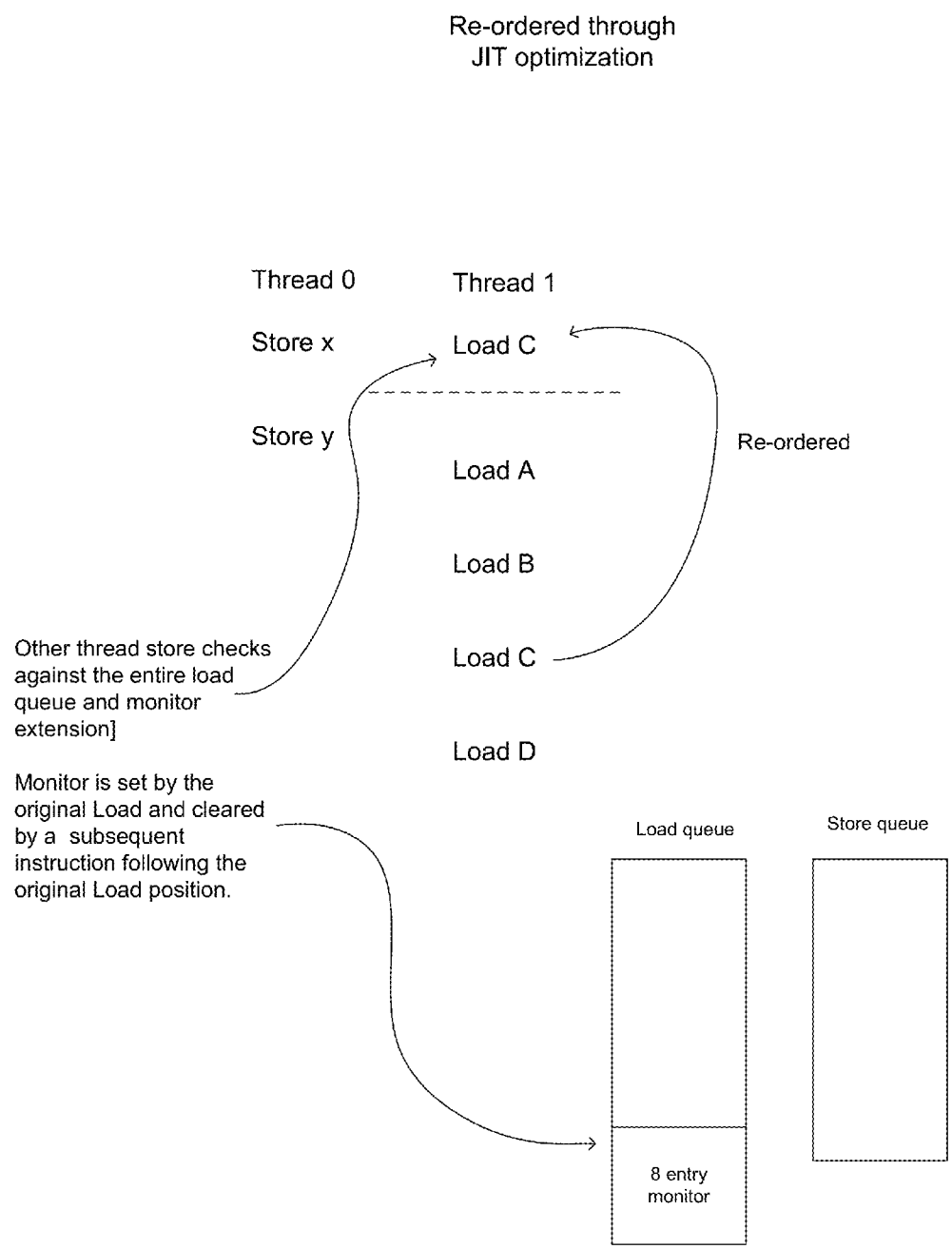
FIG. 20 shows a diagram of a reordering process through JIT optimization in accordance with one embodiment of the present invention.

FIG. 20 shows a diagram of a reordering process through JIT optimization in accordance with one embodiment of the present invention. Loads cannot dispatch ahead of other loads that are to the same address. For example, a load will check for the same address of subsequent loads from the same thread. FIG. 20 shows how other thread store checks against the entire load queue and monitor extension. The monitor is set by the original load and cleared by a subsequent instruction following the original load position. It should be noted that this solution works with both total and partial store ordering memory consistency model (e.g., x86 and ARM consistency models).

Figure 21:
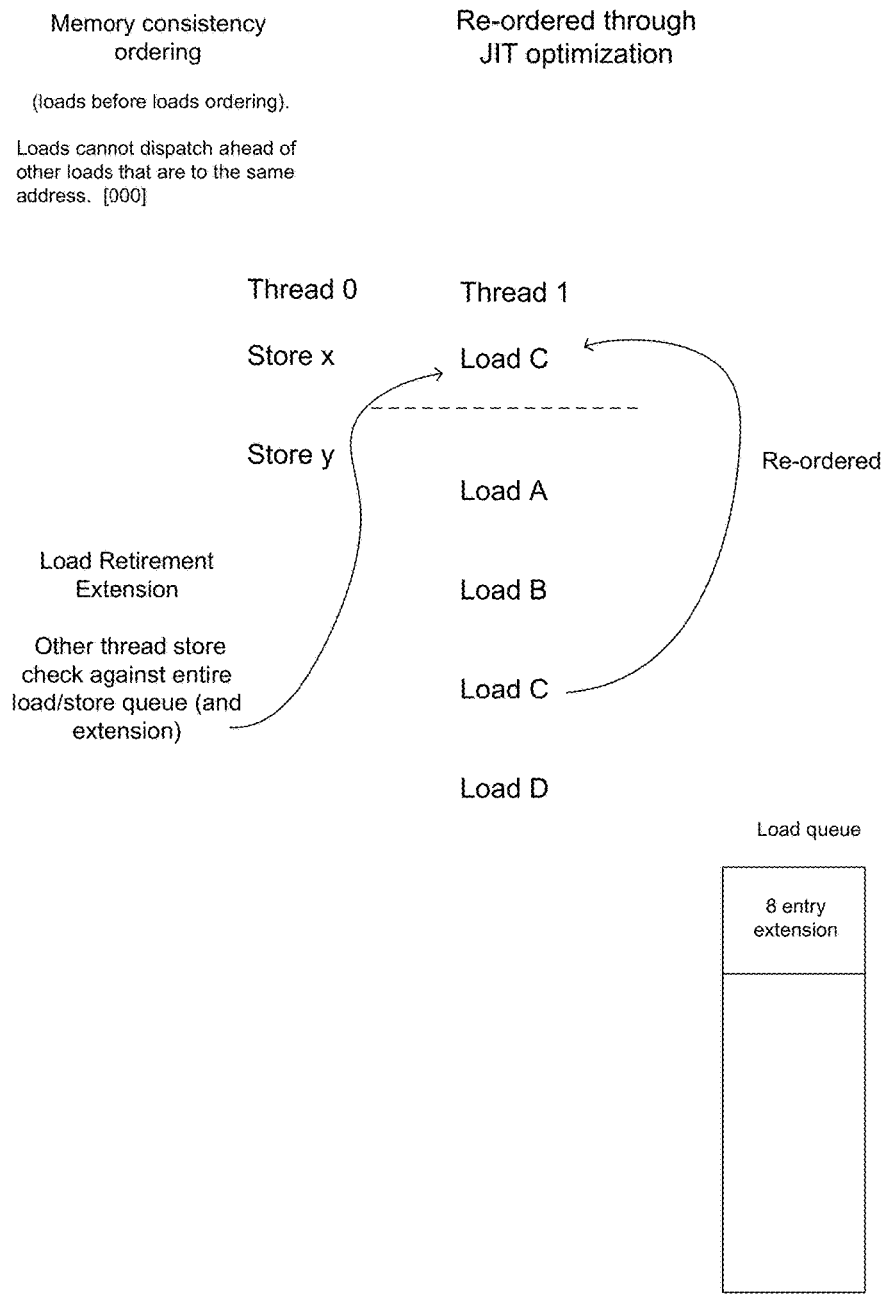
FIG. 21 shows a diagram of a reordering process through JIT optimization in accordance with one embodiment of the present invention.

FIG. 21 shows a diagram of a reordering process through JIT optimization in accordance with one embodiment of the present invention. Loads cannot dispatch ahead of other loads that are to the same address. One embodiment of the present invention implements load retirement extension. In this embodiment, other thread stores check against entire load/store queue (e.g., and extension).

In implementing this solution, all loads that retire need to stay in the load queue (e.g., or an extension thereof) after retirement up to the point of the original Load C location. When a store from the other thread comes (Thread 0) it will CAM match the whole load queue (e.g., including the extension). The extension size can be determined by putting a restriction on the number of loads that a reordered load (Load C) can jump ahead of (e.g., by using an 8 entry extension). It should be noted that this solution works with both total and partial store ordering memory consistency model (e.g., x86 and ARM consistency models).

Figure 22:
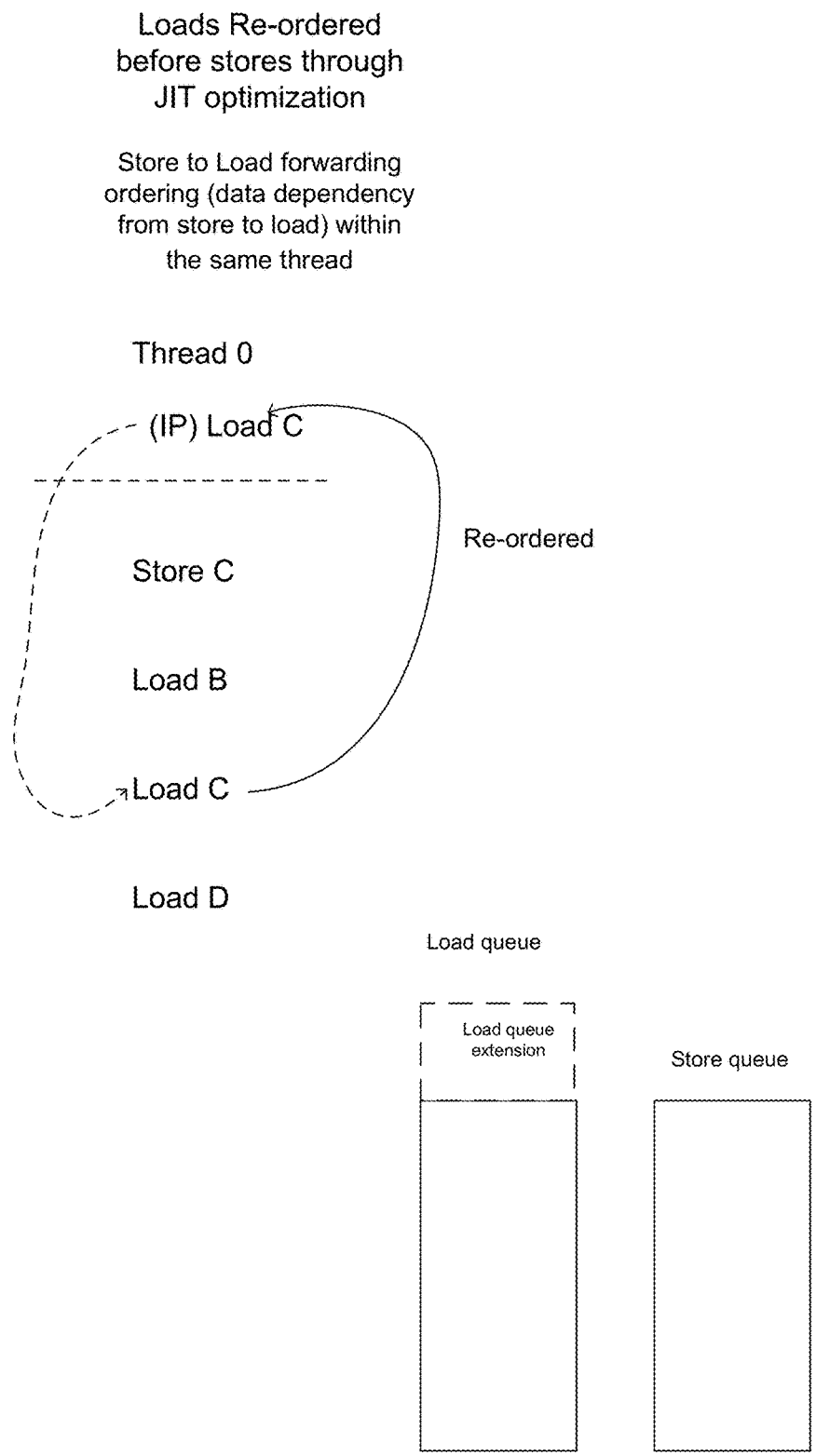
FIG. 22 shows a diagram illustrating loads reordered before stores through JIT optimization in accordance with one embodiment of the present invention.

FIG. 22 shows a diagram illustrating loads reordered before stores through JIT optimization in accordance with one embodiment of the present invention. FIG. 22 utilizes store to load forwarding ordering (e.g., data dependency from store to load) within the same thread.

Loads to the same address of a store within the same thread cannot be reordered through JIT before that store. In one embodiment, all loads that retire need to stay in the load queue (and/or extension thereof) after retirement up to the point of the original Load C location. Each reordered load will include an offset that will indicate that load's initial position in machine order (e.g., IP) in relation to the following stores.

One example implementation would be to include an initial instruction position in the offset indicator. When a store from the same thread comes it will CAM match the whole load queue (including the extension) looking for a match that indicates that this store will forward to the matched load. It should be noted that in case the store was dispatched before the load C, that store will reserve an entry in the store queue and upon the load being dispatched later, the load will CAM match against the addresses of the stores and it will use its IP to determine the machine order to conclude a data forwarding from any of the stores to that load. The extension size can be determined by putting a restriction on the number of loads that a reordered load (Load C) can jump ahead of (e.g., by using an 8 entry extension).

Another solution would be to put a check store instruction in the place of the original load. When the check store instruction dispatches, it checks against the load queue for address matches. Similarly, when loads dispatch, they check for address matches against store queue entry occupied by the check store instruction.

Figure 23:
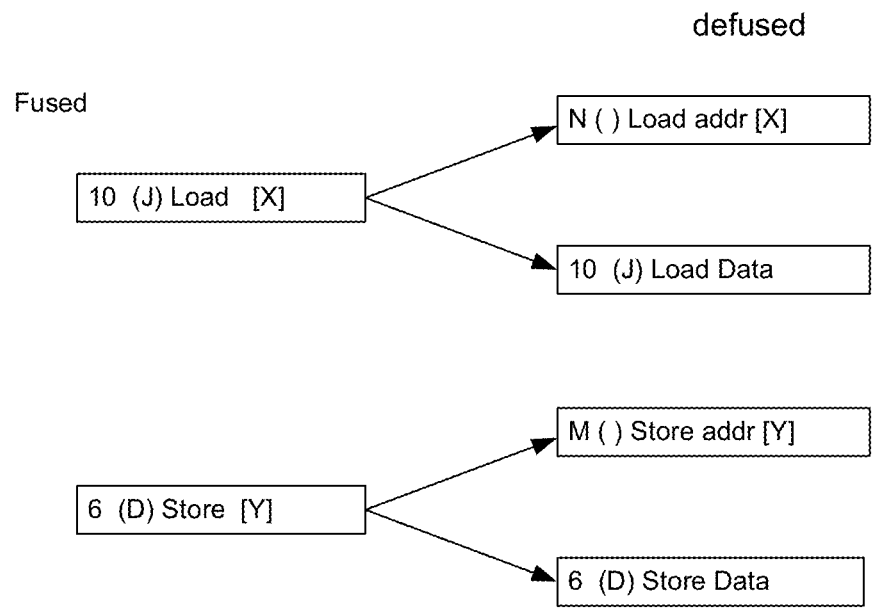
FIG. 23 shows a first diagram of load and store instruction splitting in accordance with one embodiment of the present invention.

FIG. 23 shows a first diagram of load and store instruction splitting in accordance with one embodiment of the present invention. One feature of the invention is the fact that loads are split into two macroinstructions, the first does address calculation and fetch into a temporary location (load store queue), and the second is a load of the memory address contents (data) into a register or an ALU destination. It should be noted that although the embodiments of the invention are described in the context of splitting load and store instructions into two respective macroinstructions and reordering them, the same methods and systems can be implemented by splitting load and store instructions into two respective microinstructions and reordering them within a microcode context.

The functionality is the same for the stores. Stores are also split into two macroinstructions. The first instruction is a store address and fetch, the second instruction is a store of the data at that address. The split of the stores and two instructions follows the same rules as described below for loads.

The split of the loads into two instructions allows a runtime optimizer to schedule the address calculation and fetch instruction much earlier within a given instruction sequence. This allows easier recovery from memory misses by prefetching the data into a temporary buffer that is separate from the cache hierarchy. The temporary buffer is used in order to guarantee availability of the pre-fetched data on a one to one correspondence between the LA/SA and the LD/SD. The corresponding load data instruction can reissue if there is an aliasing with a prior store that is in the window between the load address and the load data (e.g., if a forwarding case was detected from a previous store), or if there is any fault problem (e.g., page fault) with the address calculation. Additionally, the split of the loads into two instructions can also include duplicating information into the two instructions. Such information can be address information, source information, other additional identifiers, and the like. This duplication allows independent dispatch of LD/SD of the two instructions in absence of the LA/SA.

The load address and fetch instruction can retire from the actual machine retirement window without waiting on the load data to come back, thereby allowing the machine to make forward progress even in the case of a cache miss to that address (e.g., the load address referred to at the beginning of the paragraph). For example, upon a cache miss to that address (e.g., address X), the machine could possibly be stalled for hundreds of cycles waiting for the data to be fetched from the memory hierarchy. By retiring the load address and fetch instruction from the actual machine retirement window without waiting on the load data to come back, the machine can still make forward progress.

It should be noted that the splitting of instructions enables a key advantage of embodiments of the present invention to re-order the LA/SA instructions earlier and further away from LD/SD the instruction sequence to enable earlier dispatch and execution of the loads and the stores.

Figure 24:
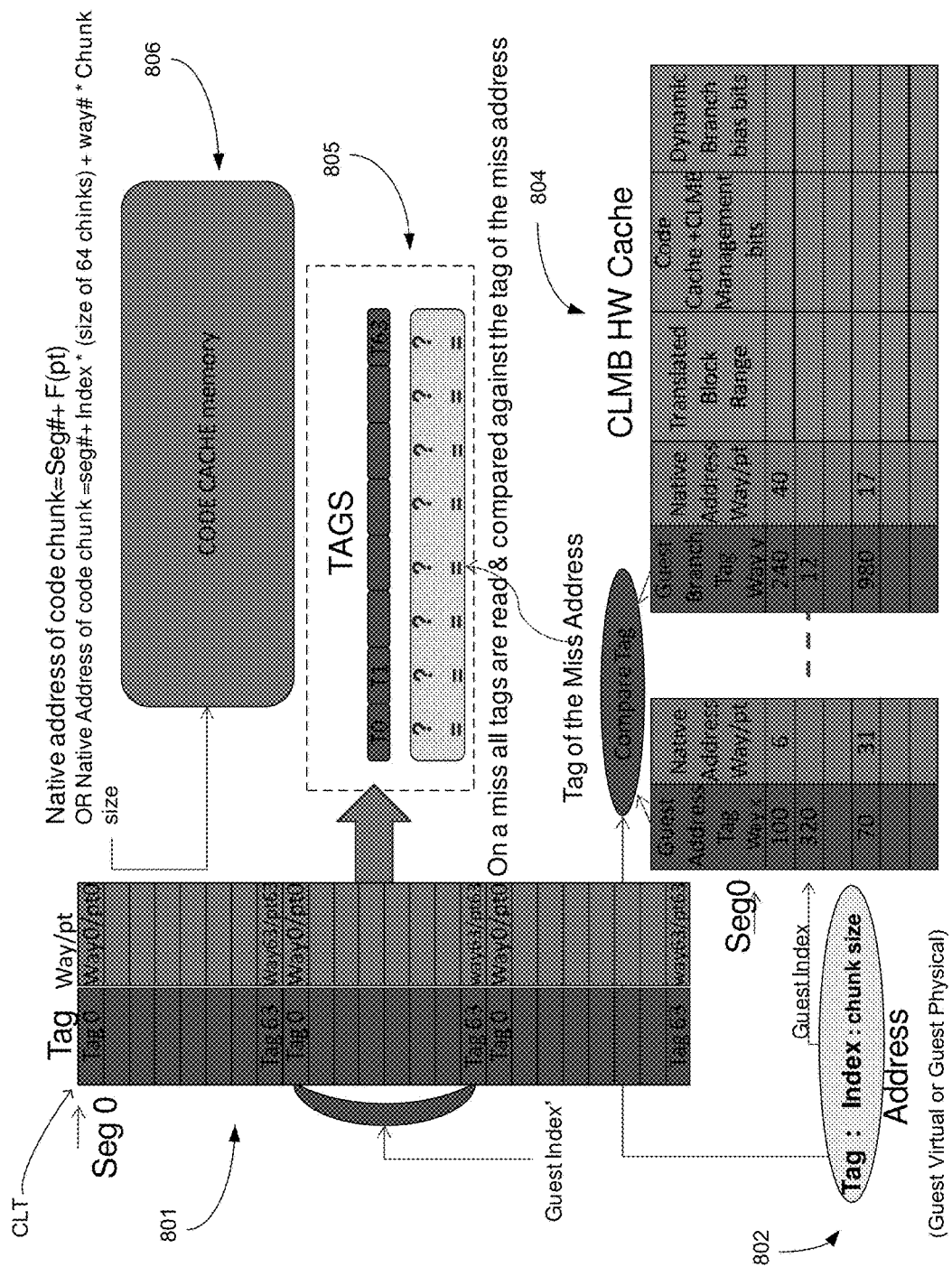
FIG. 24 shows an exemplary flow diagram illustrating the manner in which the CLB functions in conjunction with the code cache and the guest instruction to native instruction mappings stored within memory in accordance with one embodiment of the present invention.

FIG. 24 shows an exemplary flow diagram illustrating the manner in which the CLB functions in conjunction with the code cache and the guest instruction to native instruction mappings stored within memory in accordance with one embodiment of the present invention.

As described above, the CLB is used to store mappings of guest addresses that have corresponding converted native addresses stored within the code cache memory (e.g., the guest to native address mappings). In one embodiment, the CLB is indexed with a portion of the guest address. The guest address is partitioned into an index, a tag, and an offset (e.g., chunk size). This guest address comprises a tag that is used to identify a match in the CLB entry that corresponds to the index. If there is a hit on the tag, the corresponding entry will store a pointer that indicates where in the code cache memory 806 the corresponding converted native instruction chunk (e.g., the corresponding block of converted native instructions) can be found.

It should be noted that the term "chunk" as used herein refers to a corresponding memory size of the converted native instruction block. For example, chunks can be different in size depending on the different sizes of the converted native instruction blocks.

With respect to the code cache memory 806, in one embodiment, the code cache is allocated in a set of fixed size chunks (e.g., with different size for each chunk type). The code cache can be partitioned logically into sets and ways in system memory and all lower level HW caches (e.g., native hardware cache 608, shared hardware cache 607). The CLB can use the guest address to index and tag compare the way tags for the code cache chunks.

FIG. 24 depicts the CLB hardware cache 804 storing guest address tags in 2 ways, depicted as way x and way y. It should be noted that, in one embodiment, the mapping of guest addresses to native addresses using the CLB structures can be done through storing the pointers to the native code chunks (e.g., from the guest to native address mappings) in the structured ways. Each way is associated with a tag. The CLB is indexed with the guest address 802 (comprising a tag). On a hit in the CLB, the pointer corresponding to the tag is returned. This pointer is used to index the code cache memory. This is shown in FIG. 24 by the line "native address of code chunk=Seg#+F(pt)" which represents the fact that the native address of the code chunk is a function of the pointer and the segment number. In the present embodiment, the segment refers to a base for a point in memory where the pointer scope is virtually mapped (e.g., allowing the pointer array to be mapped into any region in the physical memory).

Alternatively, in one embodiment, the code cache memory can be indexed via a second method, as shown in FIG. 24 by the line "Native Address of code chunk=seg#+Index*(size of chunk)+way#*(Chunk size)". In such an embodiment, the code cache is organized such that its way-structures match the CLB way structuring so that a 1:1 mapping exist between the ways of CLB and the ways of the code cache chunks. When there is a hit in a particular CLB way then the corresponding code chunk in the corresponding way of the code cache has the native code.

Referring still to FIG. 24, if the index of the CLB misses, the higher hierarchies of memory can be checked for a hit (e.g., L1 cache, L2 cache, and the like). If there is no hit in these higher cache levels, the addresses in the system memory 801 are checked. In one embodiment, the guest index points to a entry comprising, for example, 64 chunks. The tags of each one of the 64 chunks are read out and compared against the guest tag to determine whether there is a hit. This process is shown in FIG. 24 by the dotted box 805. If there is no hit after the comparison with the tags in system memory, there is no conversion present at any hierarchical level of memory, and the guest instruction must be converted.

It should be noted that embodiments of the present invention manage each of the hierarchical levels of memory that store the guest to native instruction mappings in a cache like manner. This comes inherently from cache-based memory (e.g., the CLB hardware cache, the native cache, L1 and L2 caches, and the like). However, the CLB also includes "code cache+CLB management bits" that are used to implement a least recently used (LRU) replacement management policy for the guest to native instruction mappings within system memory 801. In one embodiment, the CLB management bits (e.g., the LRU bits) are software managed. In this manner, all hierarchical levels of memory are used to store the most recently used, most frequently encountered guest to native instruction mappings. Correspondingly, this leads to all hierarchical levels of memory similarly storing the most frequently encountered converted native instructions.

FIG. 24 also shows dynamic branch bias bits and/or branch history bits stored in the CLB. These dynamic branch bits are used to track the behavior of branch predictions used in assembling guest instruction sequences. These bits are used to track which branch predictions are most often correctly predicted and which branch predictions are most often predicted incorrectly. The CLB also stores data for converted block ranges. This data enables the process to invalidate the converted block range in the code cache memory where the corresponding guest instructions have been modified (e.g., as in self modifying code).

Figure 25:
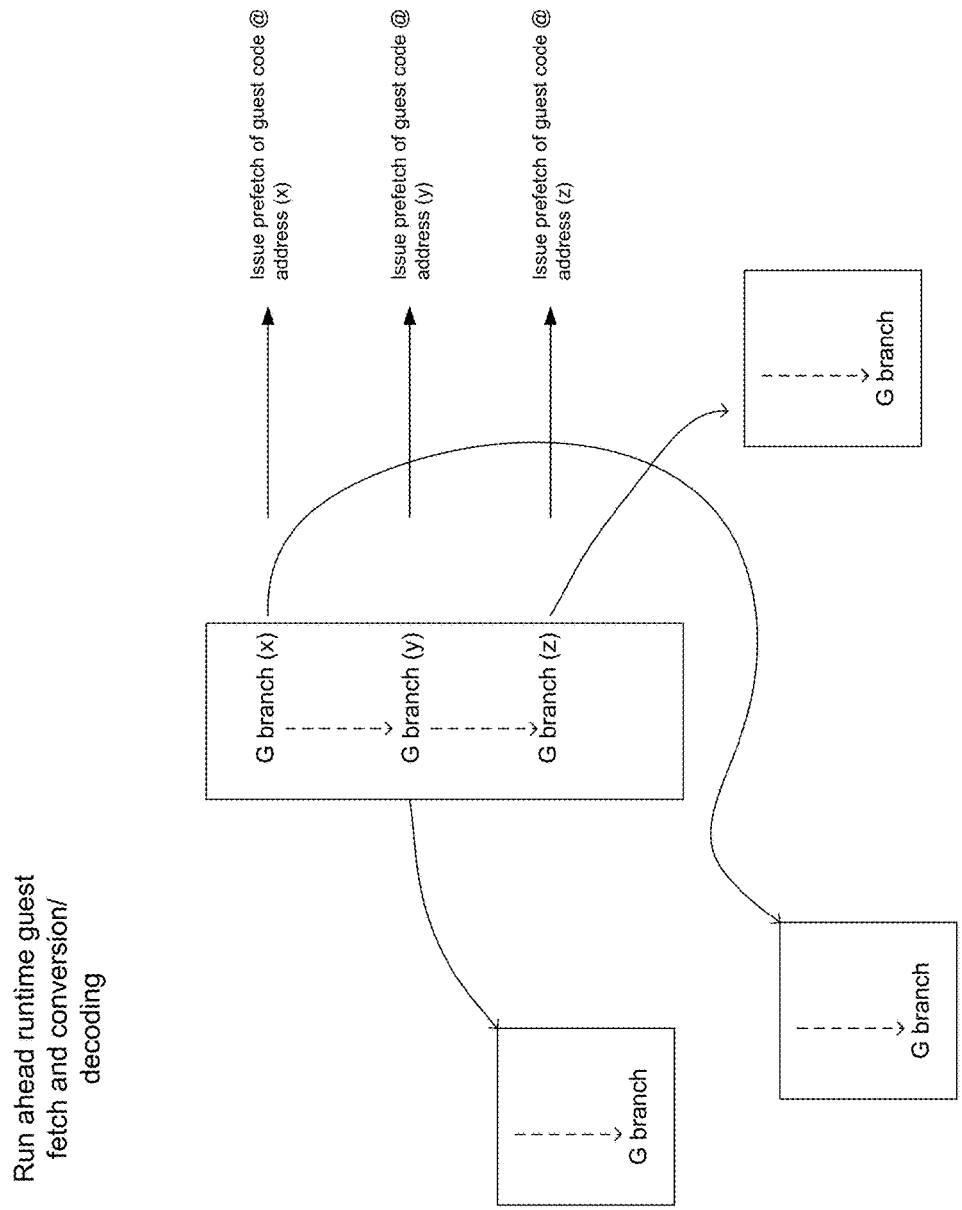
FIG. 25 shows a diagram of a run ahead run time guest instruction conversion/decoding process in accordance with one embodiment of the present invention.

FIG. 25 shows a diagram of a run ahead run time guest instruction conversion/decoding process in accordance with one embodiment of the present invention. FIG. 25 illustrates a diagram that shows that while on-demand converting/decoding of guest code, the objective is to avoid bringing guest code from main memory (e.g., which will be a costly trip). FIG. 25 shows a prefetching process where guest code is pre-fetched from the target of guest branches in an instruction sequence. For example the instruction sequence includes a guess branch X, Y, and Z. This causes an issue of a pre-fetch instruction of the guest code at addresses X, Y, and Z.

Figure 26:
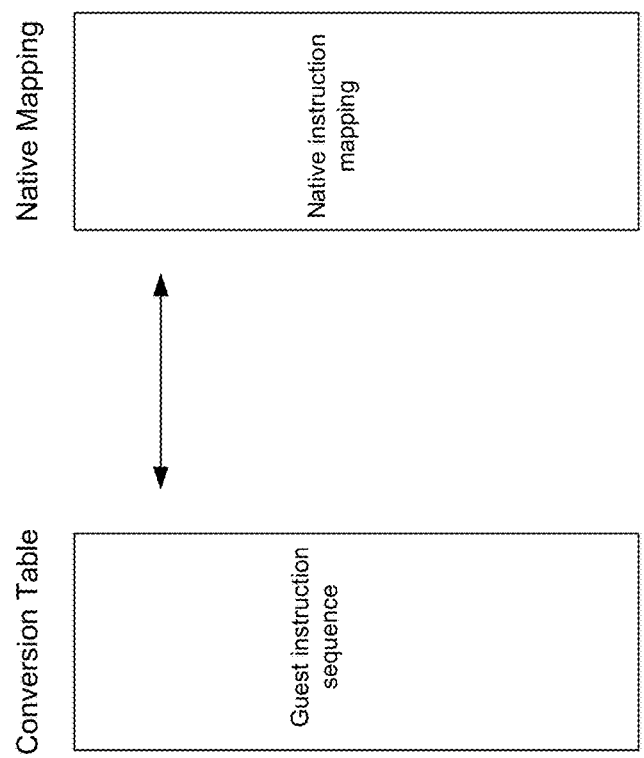
FIG. 26 shows a diagram depicting a conversion table having guest instruction sequences and a native mapping table having native instruction mappings in accordance with one embodiment of the present invention.

FIG. 26 shows a diagram depicting a conversion table having guest instruction sequences and a native mapping table having native instruction mappings in accordance with one embodiment of the present invention. In one embodiment, the memory structures/tables can be implemented as caches similar to low-level low latency cache.

In one embodiment, most frequently encountered guest instructions and their mappings are stored at a low level cache structure allowing runtime to quickly access these structures to obtain an equivalent native instruction for the guest instruction. The mapping table will provide an equivalent instruction format for the looked up guest instruction format. And using some control values store as control fields in these mapping tables to quickly allow substituting certain fields in guest instructions with equivalent fields in native instructions. The idea here is to store at a low level (e.g., caches) only the most frequently encountered guest instructions to allow quick conversion while other non-frequent guest instructions can take longer to convert.

The terms CLB/CLBV/CLT in accordance with embodiments of the present invention are now discussed. In one embodiment, A CLB is a conversion look aside buffer that is maintained as a memory structure that gets looked up when native guest branches are encountered while executing native code to obtain the address of the code that maps to the destination of the guest branches. In one embodiment, a CLBV is a victim cache image of the CLB. As entries are evicted from the CLB, they get cached in a regular L1/L2 cache structure. When the CLB encounters a miss, it will automatically look up the L1/L2 by a hardware access to search for the target of the miss. In one embodiment, a CLT is used when the target of the miss is not found in the CLB or the CLBV, a software handler is triggered to look up the entry in the CLT tables in main memory.

CLB counters in accordance with embodiments of the present invention are now discussed. In one embodiment, a CLB counter is a value that is set at the conversion time and is stored alongside metadata related to the converted instruction sequence/trace. This counter is decremented every time the instruction sequence/trace is executed and serves as a trigger for hotness. This value is stored at all CLB levels (e.g., CLB, CLBV, CLT). When it reaches a threshold it triggers a JIT compiler to optimize the instruction sequence/trace. This value is maintained and managed by the hardware. In one embodiment, the instruction sequences/traces can have a hybrid of CLB counters and software counters.

Background threads in accordance with one embodiment of the present invention are now discussed. In one embodiment, once hotness is triggered, a hardware background thread is initiated that serves as a background hardware task invisible to software and has its own hardware resources, usually minimal resources (e.g., a small register file and system state). It continues to execute as a background thread that stores execution resources on low priority and when execution resources are available. It has a hardware thread ID and is not visible to software but is managed by a low level hardware management system.

JIT profiling and runtime monitoring/dynamically checking in accordance with one embodiment of the present invention is now discussed. The JIT can start profiling/monitoring/sweeping instruction sequences/traces on time intervals. It can maintain certain values that are relevant to optimization such as by using branch profiling. Branch profiling uses branch profiling hardware instructions with code instrumentation to find branch prediction values/bias for branches within an instruction sequence/trace by implementing an instruction that has the semantics of a branch such that it starts fetching instructions from a specific address and pass those instructions through the machines front end and looking up hardware branch predictors without executing those instructions. Then the JIT accumulates those hardware branch prediction counters' values to create larger counters than what hardware provides. This allows the JIT to profile branch biases.

Constant profiling refers to profiling to detect values that do not change and optimize the code using this information.

Checking for Load store aliasing is used since it is possible sometimes to check that store to load forwarding does not occur by dynamically checking for address aliasing between loads and stores.

In one embodiment, a JIT can instrument code or use special instructions such as a branch profiling instruction or check load instruction or check store instruction.

For purposes of explanation, the foregoing description refers to specific embodiments that are not intended to be exhaustive or to limit the current invention. Many modifications and variations are possible consistent with the above teachings. Embodiments were chosen and described in order to best explain the principles of the invention and its practical applications, so as to enable others skilled in the art to best utilize the invention and its various embodiments with various modifications as may be suited to their particular uses.

What is claimed is:

1. A system for executing an agnostic runtime architecture, comprising:
   a runtime native instruction assembly component stored in a memory included within a just-in-time (JIT) conversion layer of the system, the JIT conversion layer for receiving instructions from a guest virtual machine;
   a runtime native instruction sequence formation component included within the conversion layer for receiving instructions from native code; and
   a dynamic sequence block-based instruction mapping component included within the conversion layer for code cache allocation and metadata creation, wherein the dynamic sequence block-based instruction mapping component is coupled to receive inputs from the runtime native instruction assembly component and the runtime native instruction sequence formation component;
   wherein the dynamic sequence block-based instruction mapping component receives resulting processed instructions from the runtime native instruction assembly component and the runtime native instruction sequence formation component and allocates the resulting processed instructions to a processor for execution.

2. The system of claim 1, wherein the processor includes a sequence cache to store dynamically converted sequences.

3. The system of claim 1, wherein the dynamic sequence block-based instruction mapping component further comprises:
   a system emulation/virtualization converter;
   an application code converter; and
   a system converter wherein the system emulation/virtualization converter and the application code converter implement a system emulation process, and wherein the system converter implements a system conversion process for executing code from a guest image.

4. The system of claim 3, wherein the system conversion process utilizes a multi-pass optimization process.

5. The system of claim 3, wherein the guest image contains application code and operating system/system specific code for execution.

6. A hardware microprocessor, comprising:
   a close to bare metal just in time (JIT) conversion layer;
   a runtime native instruction assembly component included within the conversion layer for receiving instructions from a guest virtual machine;
   a runtime native instruction sequence formation component included within the conversion layer for receiving instructions from native code; and
   a dynamic sequence block-based instruction mapping component included within the conversion layer for code cache allocation and metadata creation, wherein the dynamic sequence block-based instruction mapping component is coupled to receive inputs from the runtime native instruction assembly component and the runtime native instruction sequence formation component;
   wherein the dynamic sequence block-based instruction mapping component receives resulting processed instructions from the runtime native instruction assembly component and the runtime native instruction sequence formation component and allocates the resulting processed instructions to a processor for execution.

7. The microprocessor of claim 6, wherein the processor further includes a sequence cache to store dynamically converted sequences.

8. The microprocessor of claim 6, wherein the dynamic sequence block-based instruction mapping component further comprises:
   a system emulation/virtualization converter;
   an application code converter; and
   a system converter wherein the system emulation/virtualization converter and the application code converter implement a system emulation process, and wherein the system converter implements a system conversion process for executing code from a guest image.

9. The microprocessor of claim 8, wherein the system conversion process utilizes a multi-pass optimization process.

10. The microprocessor of claim 8, wherein the guest image contains application code and operating system/system specific code for execution.

11. A computer system, comprising:
    a microprocessor having a core and a plurality of caches, wherein the microprocessor further includes:
    a close to bare metal just in time (JIT) conversion layer;

a runtime native instruction assembly component stored in a memory included within the conversion layer for receiving instructions from a guest virtual machine;

a runtime native instruction sequence formation component included within the conversion layer for receiving instructions from native code; and a dynamic sequence block-based instruction mapping component included within the conversion layer for code cache allocation and metadata creation, wherein the dynamic sequence block-based instruction mapping component is coupled to receive inputs from the runtime native instruction assembly component and the runtime native instruction sequence formation component;

wherein the dynamic sequence block-based instruction mapping component receives resulting processed instructions from the runtime native instruction assembly component and the runtime native instruction sequence formation component and allocates the resulting processed instructions to a processor for execution.

12. The computer system of claim 11, wherein the processor further includes a sequence cache to store dynamically converted sequences.

13. The computer system of claim 11, wherein the dynamic sequence block-based instruction mapping component further comprises:

a system emulation/virtualization converter;

an application code converter; and a system converter wherein the system emulation/virtualization converter and the application code converter implement a system emulation process, and wherein the system converter implements a system conversion process for executing code from a guest image.

14. The computer system of claim 13, wherein the system conversion process utilizes a multi-pass optimization process.

15. The computer system of claim 13, wherein the guest image contains application code and operating system/system specific code for execution.

* * * * *